United States Patent
De Rico Herrero

(10) Patent No.: US 8,636,371 B2
(45) Date of Patent: Jan. 28, 2014

(54) EMERGENCY LIGHTING INSTALLATION

(75) Inventor: Sergio De Rico Herrero, Guadarrama (ES)

(73) Assignee: Innovation & Safety, S.L. (ES)

( * ) Notice: Subject to any disclaimer, the term of this patent is extended or adjusted under 35 U.S.C. 154(b) by 1300 days.

(21) Appl. No.: 12/302,632

(22) PCT Filed: Mar. 9, 2007

(86) PCT No.: PCT/ES2007/000130
§ 371 (c)(1),
(2), (4) Date: Nov. 26, 2008

(87) PCT Pub. No.: WO2007/138126
PCT Pub. Date: Dec. 6, 2007

(65) Prior Publication Data
US 2009/0185361 A1    Jul. 23, 2009

(30) Foreign Application Priority Data

May 26, 2006    (ES) .................................. 200601397

(51) Int. Cl.
*F21K 2/00*    (2006.01)

(52) U.S. Cl.
USPC ............... 362/34; 362/84; 362/234; 362/253; 362/362

(58) Field of Classification Search
USPC ..................................................... 362/34, 84
See application file for complete search history.

(56) References Cited

U.S. PATENT DOCUMENTS

| | | | |
|---|---|---|---|
| 3,463,915 A * | 8/1969 | Day | 362/34 |
| 3,584,211 A * | 6/1971 | Rauhut | 362/34 |
| 3,991,820 A * | 11/1976 | Huggins | 165/111 |
| 4,117,450 A | 9/1978 | Lavalley et al. | |
| 4,959,756 A | 9/1990 | Dodson | |
| 5,406,463 A | 4/1995 | Schexnayder, Sr. | |
| 5,979,328 A | 11/1999 | Rodrigues | |
| 6,685,331 B1 * | 2/2004 | Rockwell | 362/34 |
| 6,729,502 B2 * | 5/2004 | Lewis et al. | 222/181.3 |
| 6,776,495 B2 * | 8/2004 | Nomiyama | 362/34 |
| 7,255,691 B2 * | 8/2007 | Tolkoff et al. | 606/9 |

FOREIGN PATENT DOCUMENTS

| | | |
|---|---|---|
| DE | 10248787 | 4/2004 |
| FR | 2723896 | 1/1996 |
| JP | 2000-164001 A | 6/2000 |
| WO | 9838454 | 3/1998 |
| WO | 9838455 | 3/1998 |
| WO | 98/38454 A1 | 9/1998 |

OTHER PUBLICATIONS

International Search Report; PCT/ES2007/000130; Aug. 6, 2007.

* cited by examiner

*Primary Examiner* — Jong-Suk (James) Lee
*Assistant Examiner* — Mark Tsidulko
(74) *Attorney, Agent, or Firm* — Cantor Colburn LLP

(57) ABSTRACT

Emergency lighting installation with a first reservoir and a second reservoir respectively for a first component and a second component of a liquid chemoluminescent product, and connected to product outlets in remote zones via a distributor system; a mixing system which includes receptor means of an activation signal, for mixing the components in response to the activation signal; sealing means which seal the reservoirs when the installation is not activated by the activation signal; an evacuation system that can be activated by the activation signal and connected to the reservoirs for mixing the components of the chemoluminescent product and evacuating them via the reservoirs and for impelling the luminescent product towards the product outlets.

45 Claims, 20 Drawing Sheets

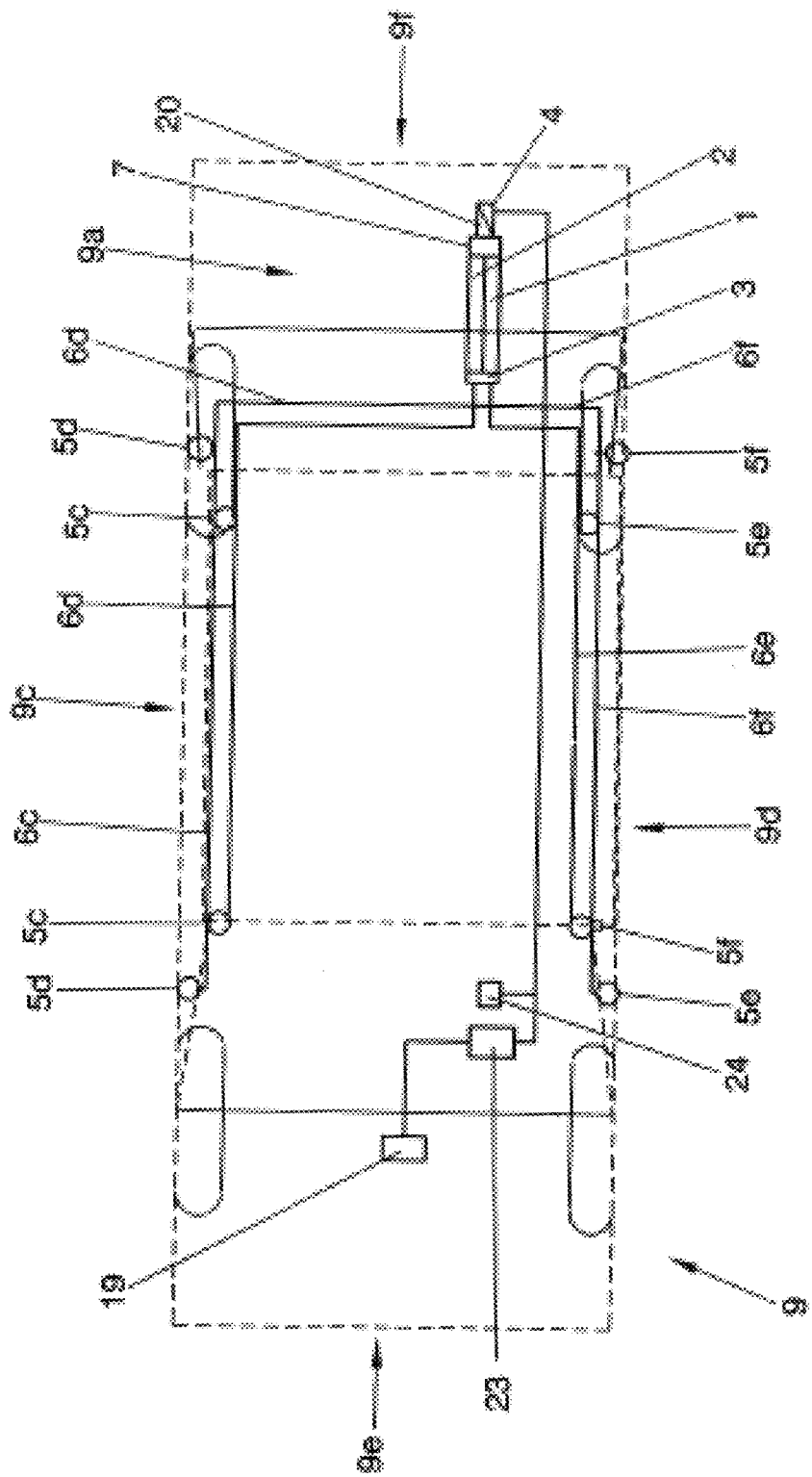

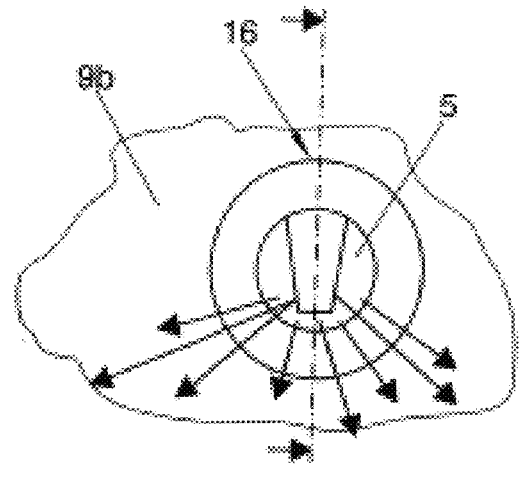
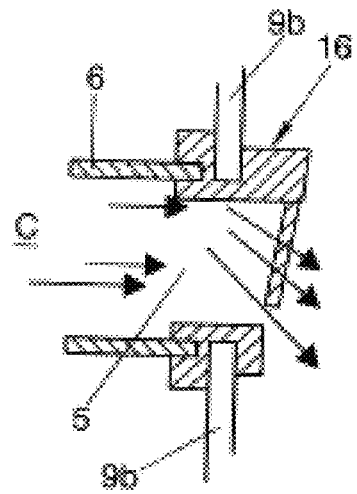
FIG. 4A  FIG. 4B
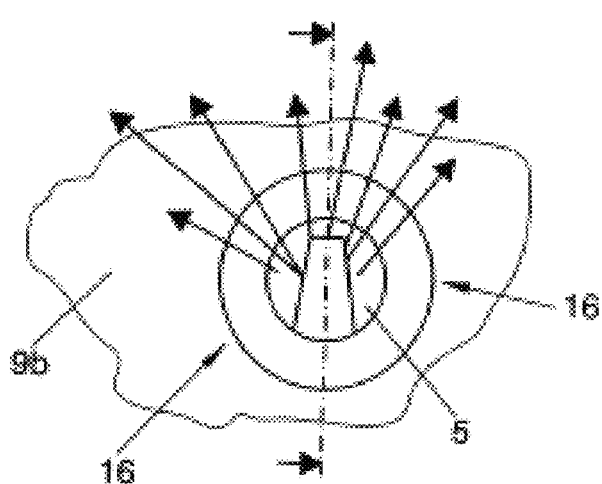
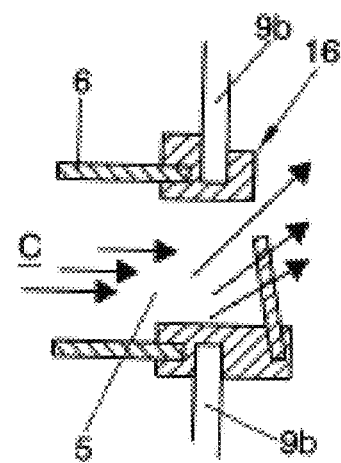
FIG. 4C  FIG. 4D

EMERGENCY LIGHTING INSTALLATION

TECHNICAL FIELD OF THE INVENTION

The invention comes within the technical sector of safety systems and particularly emergency signaling systems for zones that need to be lit in order to provide greater visibility for parts and/or environs of installations or vehicles. The invention can apply to emergency lighting for zones in industrial facilities such as ports, airports, sports centers, metro and railway stations and tunnels, to buildings such as homes and offices, sports centers and shopping centers, it is particularly useful in the emergency signaling of vehicles and parts thereof, such as ships, aircraft, helicopters, containers, railway and metro trains and, especially, for land vehicles including mobile machinery for public works.

BRIEF DESCRIPTION OF RELATED ART

When an emergency occurs, it is of supreme importance that there should exist adequate visibility for certain zones. When the emergency takes place in a zone of little or no visibility, such as for example in enclosed zones of offices or facilities, or in conditions of low visibility such as for example at night or in the presence of fog or smoke, it becomes necessary to create artificial lighting, whether this be for marking certain places or points, such as indicators for emergency exits or in vehicles that have been involved in accidents, or for producing conditions of visibility in a space such as for example in halls, rooms, washrooms, operating theaters, corridors or stairways, or in places in which an emergency situation has arisen, such as for example in the area around a vehicle that has been involved in an accident or which has broken down.

In the case of a breakdown or, especially, of a traffic accident, involving a vehicle such as for example a land vehicle, the position of the vehicle needs to be signaled in order to warn other drivers of the presence of the stationary vehicle so as to avoid subsequent chain collisions. This signaling is especially important in situations in which the vehicle is stationary in a position that invades the carriageway and/or in atmospheric conditions of low visibility.

In order to provide emergency lighting in buildings or large vehicles such as aircraft, ships and trains, there exist various types of emergency lighting, generally based on lighting devices powered by emergency electrical sources, while, in order to provide emergency signaling land motor vehicles such as cars, trucks, etc., are provided with a manually activated electrical system ("warning") which is triggered by means of simultaneously operating the vehicle's indicators. Nevertheless, this system presents the drawback that it requires the user to press a control in order to activate it, which implies that when the occupants are unconscious or immobilized on account of an accident, the activation of the system becomes impossible and so the vehicle remains without any signaling. Moreover, in cases of breakdowns or accidents implying the cutting off of the electrical supply, these systems cannot be activated and, therefore, they do not permit the stationary vehicle to be signaled.

Chemoluminescent products, such as luminol, are also known which permit light to be generated on the basis of a chemical reaction between two or more components when these components come into contact with each other. In devices that produce chemoluminescent lighting, the components are kept stored in separate reservoirs of the device, and they are only mixed when it is wished to generate light. Chemoluminscent products and their components. Known devices of this type are described in, for example, U.S. Pat. No. 4,814,949, U.S. Pat. No. 4,635,166, U.S. Pat. No. 4,184,193, U.S. Pat. No. 4,015,111, U.S. Pat. No. 3,940,604, U.S. Pat. No. 3,576,987, U.S. Pat. No. 4,678,608, U.S. Pat. No. 3,749,679, U.S. Pat. No. 3,391,068, U.S. Pat. No. 3,391,069, U.S. Pat. No. 3,597,362.

In particular, U.S. Pat. No. 3,940,604 describes an emergency lighting system which comprises an array of chemoluminescent devices each one connected to the electrical system. Each device consists of reservoirs in which the components of the chemoluminescent product are kept separate and a system that includes an electromagnet which keeps a spring compressed which in turn is incorporated into a mechanism associated with the reservoirs. In the event of a power cut, the electromagnet loses its capacity to compress the spring, which is therefore released and allows the components of the chemoluminescent products to mix, thereby producing the emergency lighting. The disadvantage of this system is that the chemoluminescent device is activated every time a power cut takes place and it has to be replaced, at least in part, every time after having been activated.

German patent DE-10248787-A1 in turn describes an emergency lighting system for motor vehicles which includes at least one chemoluminescent device and an actuator for activation of the device. The device comes into operation automatically in the event of accident for which a control system is provided which sends an activation signal to the actuator. The control system can be connected to the actuators for an array of chemoluminescent devices. The chemoluminescent devices that are used in the system of German patent application DE-10248787-A1 are automatic devices fitted to various parts of the vehicle, which has the disadvantage that spaces are required in the vehicle body plus the fact that, in the event of one of these devices receiving a blow, it could easily break and be rendered useless.

It was therefore desirable to be able to have an emergency signaling system that did not have the drawbacks of the state of the art. Moreover, it was particularly desirable to be able to have an emergency signaling system for vehicles which would be independent of their electrical power supply from the vehicle battery, which would be able to be activated automatically, with a simple configuration and which would permit clearly visible signaling of the vehicle in the event of an emergency.

BRIEF SUMMARY OF THE INVENTION

The present invention relates to a system with the characteristics described above, enumerated by means of an emergency lighting installation, including a first reservoir for a first component of a liquid chemoluminescent product, a second reservoir for a second component of a liquid chemoluminescent product, a mixing system with means for receiving an activation signal that permits the components to be mixed in response to the activation signal in order to obtain the chemoluminescent product; and sealing means which seal the reservoirs when the installation is not activated by the activation signal;

where the reservoirs are provided in a distant place of remote zones requiring emergency lighting;

the installation furthermore including a distribution system linked to the reservoirs and with product outlets in each remote zone requiring emergency lighting;

an evacuation system included in the mixing system, which can be activated by the activation signal and is connected to the reservoirs for evacuating the components of the chemoluminescent product of the reservoirs and in order to impel the luminescent product obtained following the mixing of the components via the distribution system towards the outlets in the vehicle body. The first reservoir preferably includes at least one first evacuation outlet and the second reservoir preferably includes at least one second evacuation outlet which are respectively closed by sealing means when the installation is in the inactive state.

Chemoluminescent products suitable for use in the installation of the present invention are known in themselves, for example, luminol. The first component and the second component can be liquids or the first component can be a liquid while the second component can be solid. Likewise, the first component can be a mixture of solid products which, being dry, do not enter into a chemoluminescent reaction until mixed with the second component which, in this case, is a suitable solvent.

When the present invention is introduced into a vehicle, for example a land vehicle such as a car, or aerial vehicle such as a plane or a helicopter, the reservoirs and the mixing system are arranged in an interior zone of the vehicle while the product outlets are provided in the exterior parts of the vehicle. In this case, the activation signal can be generated by impact detector means that are conventional in themselves, which transmit the activation signal to the receiving means when they detect a greater intensity than the rated impact intensity. These sensor means can form part of the system of the present invention or they can be sensor means already existing in the vehicle, such as for example the sensors for activation of airbags or for pre-tensioning of the safety belts. In this case, the system can also advisably incorporate means of timing which, when the receiving means receive the activation signal of the impact detector means, delay the activation of the impeller system for a predetermined period of time, such as for example from 5 to 20 seconds, in order, in the event of an accident, to prevent the release of the chemoluminescent product from starting prior to the moment the vehicle comes to a halt.

In accordance with the invention, at least one of the product outlets can be provided with a spray nozzle.

When the installation of the present invention is included in a vehicle, such nozzle or nozzles can be oriented in such a way that the chemoluminescent product is projected onto at least part of the vehicle body which makes some of the surface of the vehicle clearly visible. In addition, it can be oriented in such a way that the chemoluminescent product is projected onto at least part of the environs of the vehicle, which helps not only to signal the place where the vehicle is located but also to light the zone. On the other hand, when the installation of the present invention is included in a construction, such as in a building or a ship, these nozzles can be configured as sprinkler type sprays, which are in themselves known in fire-fighting installations and are conventional in themselves.

Alternatively, or complementarily, at least one of the product outlets can be connected to a product tank that is at least translucent and visible from the outside of the body, at least when it contains the chemoluminescent product.

When these tanks correspond to an installation in a vehicle, these translucent tanks can have the appearance of headlights, rear lights or luminous strips which, when the present invention is applied to a land vehicle, can be incorporated into the side trim and/or into the vehicle fenders, which enables the presence of the vehicle to be made visible and prevents the chemoluminescent liquid from escaping to the environment, while when these tanks correspond to an installation included in a construction, they can be translucent or transparent receptacles.

The evacuation outlets preferably lead to the mixing zone in such a way that, pushed by the impeller system which forms part of the evacuation system, on penetrating to the sealing means and exiting from their respective reservoirs, the components immediately mix, reacting together and forming the chemoluminescent product. The sealing means can be automatic valves which open in response to an increase in pressure from the fluid in the reservoir that they seal, membranes that break when the pressure of the fluid in the reservoir they seal increases, or flaps that open when the pressure of the fluid in the reservoir they seal increases.

In a preferred embodiment of the invention, the impeller system contains a first plunger displaceable in the first reservoir towards the first evacuation outlet, a second plunger displaceable in the second reservoir towards the second evacuation outlet; and means of actuation in order to push the plungers towards the evacuation outlets when the impeller system receives the actuation signal. In this embodiment, the reservoirs are preferably cylindrical though they can also have other configurations. The means of actuation for pushing the plungers can comprise at least one pyrotechnic device, similar to that used for activation of the airbags with which the actuation of the plungers becomes totally independent of the power supply from the vehicle battery. Alternatively, the means of actuation for pushing the plungers can comprise at least one electric motor. In this case, the impeller system can advisably also include a source of electrical supply independent of the vehicle battery.

In another embodiment of the invention, the reservoirs are located in an interior chamber, such as for example in a cylindrical chamber, in a housing such that the first reservoir is located in a first axial space in the cylindrical chamber and the second reservoir is a tubular receptacle made of a flexible plastic material backed by a part of its perimeter onto a recess in the interior wall of the cylindrical chamber. In this embodiment, the impeller system comprises a single plunger that can be displaced in the interior chamber and actuator means for pushing the single plunger towards the first evacuation outlet when the impeller system receives the actuation signal. The single plunger can advisably have a head with a configuration whose diameter becomes narrower in the direction towards the first evacuation outlet, for example a hemispherical or trunco-conical configuration in the case in which the chamber is cylindrical. In this way, as the plunger advances towards the mixing zone, the head of the plunger progressively pushes the first component of the chemoluminescent product in the first reservoir towards the mixing zone and progressively compresses the second reservoir in such a way that the second component of the chemoluminescent product is progressively evacuated from the second reservoir through the second evacuation outlet towards the mixing zone. The second reservoir can have an ogive transverse cross-section and preferably have a transverse extension that is less than half the transverse cross-section of the cylindrical chamber. In this case also, the impeller system can include a pyrotechnic device or at least an electric motor of the type mentioned previously for pushing the single plunger.

In yet another embodiment of the invention, the first evacuation outlet of the first reservoir is connected to an inlet opening of the second reservoir and the mixing zone is located in the second reservoir as a continuation of the inlet opening. In this embodiment, the means of actuation include a first actuation device for pushing the first plunger towards the first evacuation outlet and a second actuation device for pushing the second plunger towards the second evacuation outlet, while the impeller system includes generator means of sequential orders for activation connected to the receiving means. When the receiving means have received an activation signal, the generator means send a first activation order which activates the first actuation device for pushing the first plunger towards the first evacuation outlet in response to the first order in such a way that the first component of the chemoluminescent product is decanted to the second reservoir via the inlet opening in order to mix the first component with the second component in order to form the chemoluminescent product in the second reservoir. In this way, the two components of the chemoluminescent product are mixed in the second reservoir. Later on, the generator means generate a second activation order, generated when the first component has been at least partially decanted to the second reservoir, which activates the second activation device for pushing the second plunger towards the second evacuation outlet in response to the second order, evacuating chemoluminescent product via the second evacuation outlet.

In an advantageous embodiment of the invention, the mixing zone is a mixing chamber to which the evacuation outlets lead. When this embodiment is applied to a vehicle, the distribution system also includes at least one right main duct which extends along the interior of the vehicle body and links the mixing zone with at least one right product outlet in a right lateral part of the vehicle body, as well as at least one left main duct which extends along the interior of the vehicle body and links the mixing zone with at least one left product outlet in a left lateral part of the vehicle body. In this embodiment, the right main duct can include an upper right distribution duct with at least one upper right product outlet, and a lower right distribution duct with at least one lower right product outlet; while the left main duct can include an upper left distribution duct with at least one upper left product outlet, and a lower left distribution duct with at least one lower left product outlet.

At least one of the upper product outlets can be situated in the upper part of the vehicle while at least one of the lower product outlets can be situated in the lower part of the vehicle. Likewise, the distribution system can include at least one front product outlet linked to one of the ducts. In this case the distribution system preferably includes a right front product outlet and a left front product outlet. The system can in turn include at least one rear product outlet linked to at least one of the ducts and preferably a right rear product outlet and a left rear product outlet.

Each one of the ducts mentioned above can be connected to the mixing chamber via a throat which passes through a wall surrounding the mixing chamber, with each throat being able to be blocked by a blocking pendulum provided in the mixing chamber. The blocking pendulum comprises an upper part, a lower part heavier than the upper part and a tilting shaft between the lower part and the upper part in such a way that, due to gravity, the blocking pendulum is at all times in the vertical position independently of the position that the vehicle is in. The lower part of the blocking pendulum is dimensioned for allowing at least one of the throats to be free when the vehicle is in the horizontal position, and for blocking at least one of the throats when the vehicle is in the overturned position. In this way, when the vehicle has overturned onto one of its sides, the throats connected to the outlets of the side on which the vehicle is resting are kept closed by the lower part of the blocking pendulum and the throats connected to the outlets of the upper side are left free, while when the vehicle has overturned onto its roof, the throats connected to the upper outlets become closed by the lower part of the blocking pendulum while the throats connected to the lower outlets are left free.

Alternatively, the distribution ducts can be connected to the mixing chamber via separate electrovalves, provided at the start of the each distribution duct. In order to control these electrovalves and thereby permit a selection to be made of which of the ducts are to open at the moment the chemoluminescent product is expelled, an electrical opening selector for electrovalves is provided, and which is described now. Assuming that one has to control four electrovalves (for two upper distribution ducts and two lower distribution ducts), a polygonal cavity is provided with four sides, each one of which houses an electric switch. Positioned inside the cavity is a ball made of a conducting material which is free to move around. Owing to the action of gravity, the ball will also be in the position of lower equilibrium, actuating the switch to be found there. The switches can be push-buttons or they can respectively comprise two electrical contacts emerging towards the interior of the cavity and separated from each other in which case the ball has sufficient dimensions such that, when it is situated in one of the four sides, it permits contact with the two respective electrical contacts on the side where the ball is to be found due to the effect of gravity. In this way, the electrovalves that have to be opened and those that have to remain closed are selected automatically.

In an embodiment of the installation of the present invention especially applicable to constructions, such as buildings or ships, the distribution system includes an array of pipes via which the evacuation outlets from the reservoirs are connected to the product outlets. In this embodiment the reservoirs are preferably tanks, or chambers of a single tank, provided in an initial zone of the construction and the product outlets are arranged in at least one second zone of construction. The first evacuation outlet can be provided in a lower part of the first tank while the second evacuation outlet can be provided in a lower part of the second tank. In turn, the mixing zone can be a mixing chamber connected to the evacuation outlets of the reservoirs and to the distribution system.

In this embodiment of the installation, the mixing system can include a first pipeline that connects the first evacuation outlet of the first reservoir to the mixing chamber, and a second pipeline that connects the second evacuation outlet of the second reservoir to the mixing chamber. The mixing chamber can be provided in a plane below the evacuation outlets from the reservoirs. The mixing system can include a first electric pump for pumping the first component of the chemoluminescent product from the first evacuation outlet as far as the mixing chamber, and a second electric pump for pumping the second component of the chemoluminescent product from the second evacuation outlet as far as the mixing chamber. These electric pumps preferably have sufficient power for impelling the chemoluminescent product from the mixing chamber to the product outlets. The mixing system can in turn include, as an alternative or complementarily, a impeller electric pump connected to the mixing chamber and to the distribution system for impelling the chemoluminescent product from the mixing chamber to the product outlets.

In an advantageous embodiment of the invention applied in a construction, the first evacuation outlet of the first reservoir is connected, for example via a decanting duct, to an inlet opening of the second reservoir and the mixing zone is situated in the second reservoir as a continuation of the inlet opening. The inlet opening is preferably provided in the upper part of the second reservoir. In turn, the second evacuation outlet of the first reservoir is connected to the distribution system. In this advantageous embodiment, the installation furthermore includes decanting means for decanting the first component of the chemoluminescent product from the first reservoir to the second reservoir, and generator means of sequential orders for activation connected to the receiving means for sequentially activating the decanting means and the impeller system.

In this embodiment the first reservoir is preferably provided in a plane higher than the second reservoir, the first evacuation outlet is provided in the lower part of the first reservoir, and the decanting means include a decanting electrovalve which opens in response to an opening order generated by the generator means for sequential orders. In this case too, the mixing system can include an electric impeller pump connected to the second evacuation outlet and to the distribution system. Equally, the decanting means can include an electric decanting pump that can be actuated in response to an activator order and connected to the decanting duct for decanting the first component of the chemoluminescent product from the first reservoir to the second reservoir.

The interest of the present invention lies in the extraordinary effectiveness of signaling and lighting provided by the chemoluminescent reagent when employed in this way and in the duration of its light emission which can last for between 8 and 12 hours. Likewise, its particular feature of emitting light without giving off heat is of vital importance since this eliminates a possible source of ignition which could aggravate the situation in the event of an accident.

By virtue of all this, the invention becomes the ideal solution in many different situations and scenarios, where the important factor is the speed of effective and lasting signaling and lighting of the zone of an emergency or of an accident, especially where sources of ignition constitute a major potential threat. Moreover, the known innocuousness of chemoluminescent products means that there is no fear for people who become splashed by the product, a situation which, moreover, is beneficial since it makes it for the emergency and rescue teams to locate them.

BRIEF DESCRIPTION OF THE FIGURES

Described below are some embodiments and aspects of the present invention on the basis of some figures, in which

FIG. 3 is a schematic view in upper plan showing in greater detail the location and interrelation of the various components of the first embodiment of the signaling system shown in FIGS. 1 and 2;

FIGS. 4A-4D are schematic views of embodiments of the spray nozzles that can be used in the first embodiment of the signaling system shown in FIGS. 1, 2 and 3;

DETAILED DESCRIPTION OF THE INVENTION

Figure 1:
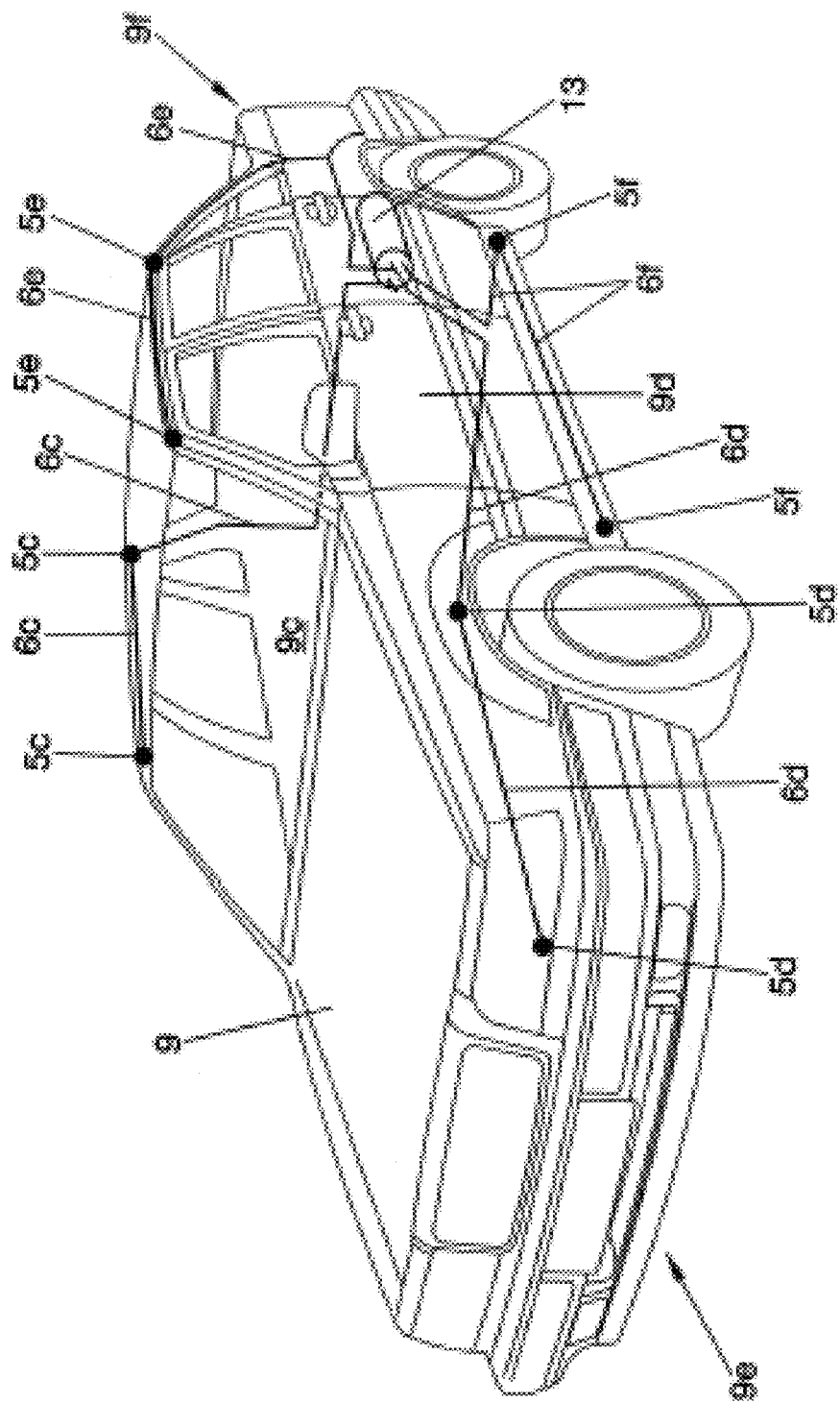
FIG. 1 is a schematic front view in perspective view of a motor vehicle in which a first embodiment of the emergency signaling system of the present invention has been fitted.
Figure 2:
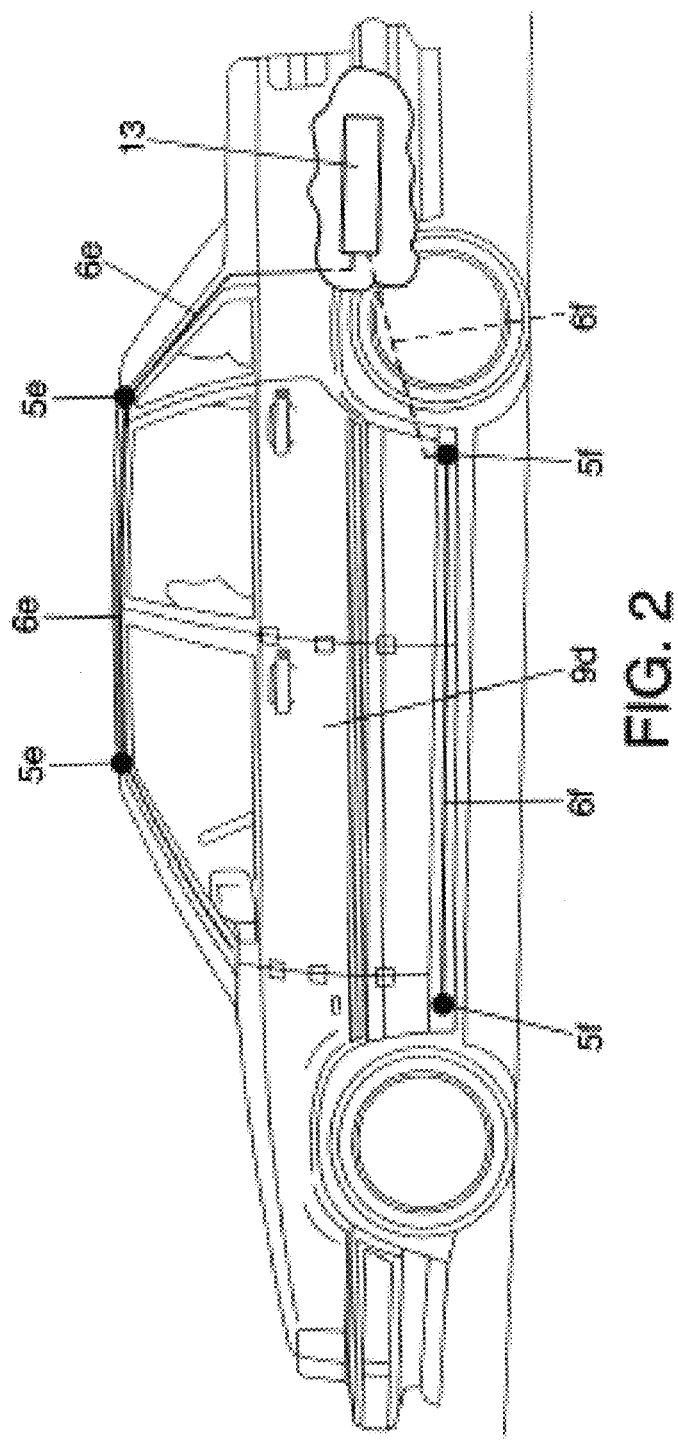
FIG. 2 is a schematic sideways view of the vehicle shown in FIG. 1.

In the first embodiment of the system of the invention shown in FIGS. 1 to 3, the system is applied to an automobile vehicle 9 and includes a housing 13 in which are provided some reservoirs 1,2 each of which contains one of the components of a chemoluminescent product, an impeller system 7 for evacuating the components towards a mixing system 3, along with some receiving means 4 for activation signals for the impeller system 7, and a timer 20 which delays the activation of the impeller system when the receiving means 4 have received such signal. The activation signal can come from impact detector means 19, conventional in themselves, and which can be the same as those used for activation of the triggering device 23 for the airbags of the vehicle. Alternatively, the signal can come from an actuation control 24, which can be actuated manually by the driver or a passenger, for example. The housing 13 is provided in an interior zone 9a of the vehicle, specifically in the rear part 9f in the zone of the trunk.

The mixer system 3 is connected to an upper right distribution duct 6c with upper product outlets 5c in the upper part of the right side part 9c of the vehicle 9, along with a lower right distribution duct 6d with lower product outlets 5d in the lower part of the right side part 9c of the vehicle 9. In turn, the mixer system is also connected to an upper left distribution duct 6e with upper product outlets 5e in the upper part of the left side part 9d of the vehicle, along with a lower left distribution duct 6f with lower product outlets 5f in the lower part of the left side part 9d of the vehicle 9. The product outlets 5c,5d,5e,5f are situated in the external part of the body of the vehicle 9.

The product outlets 5c,5d,5e,5f can be configured in the manner of spray nozzles 16 in accordance with that shown in FIGS. 4A-4D.

So, FIGS. 4A and 4B show a first embodiment of a spray nozzle 16 arranged in a product outlet 5 provided in the exterior part 9b of the vehicle body. This nozzle 16, conventional in itself, expels the chemoluminescent product C downwards, due to which it is especially suited for the upper product outlets owing to the fact that it projects the chemoluminescent product in such a way that it can also sprinkle the exterior part 9b of the vehicle.

In the second embodiment of the spray nozzle 16, conventional in itself, it sprays the chemoluminescent product C upwards onto the side part of the vehicle. Consequently, this embodiment of the spray nozzle 16 is especially suited for the lower product outlets given that, apart from spraying the exterior part 9b when the vehicle is stationary in the "normal" position, it also sprays the exterior part 9b when the vehicle has overturned and it upside down.

Figure 5:
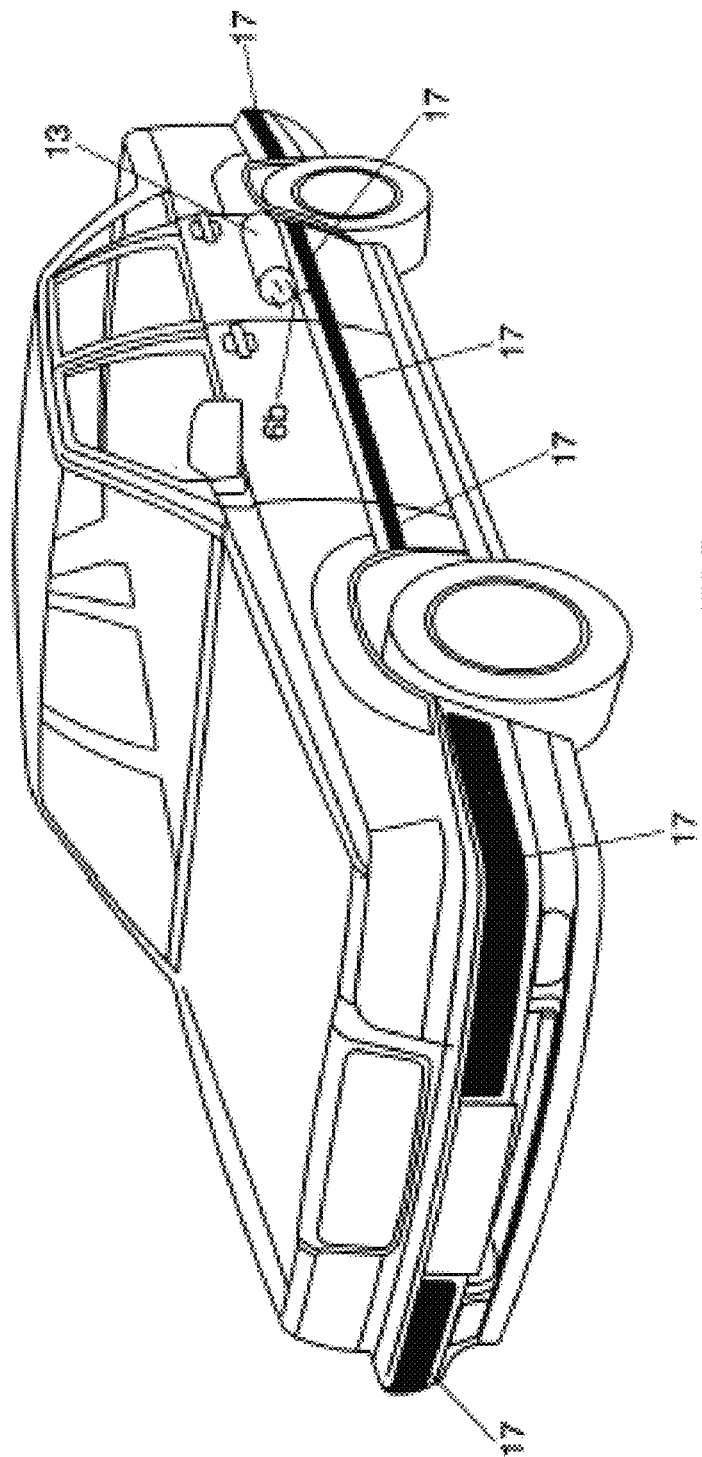
FIG. 5 is a schematic view in front perspective view of a motor vehicle in which a second embodiment of the emergency signaling system of the present invention has been fitted.
Figure 6:
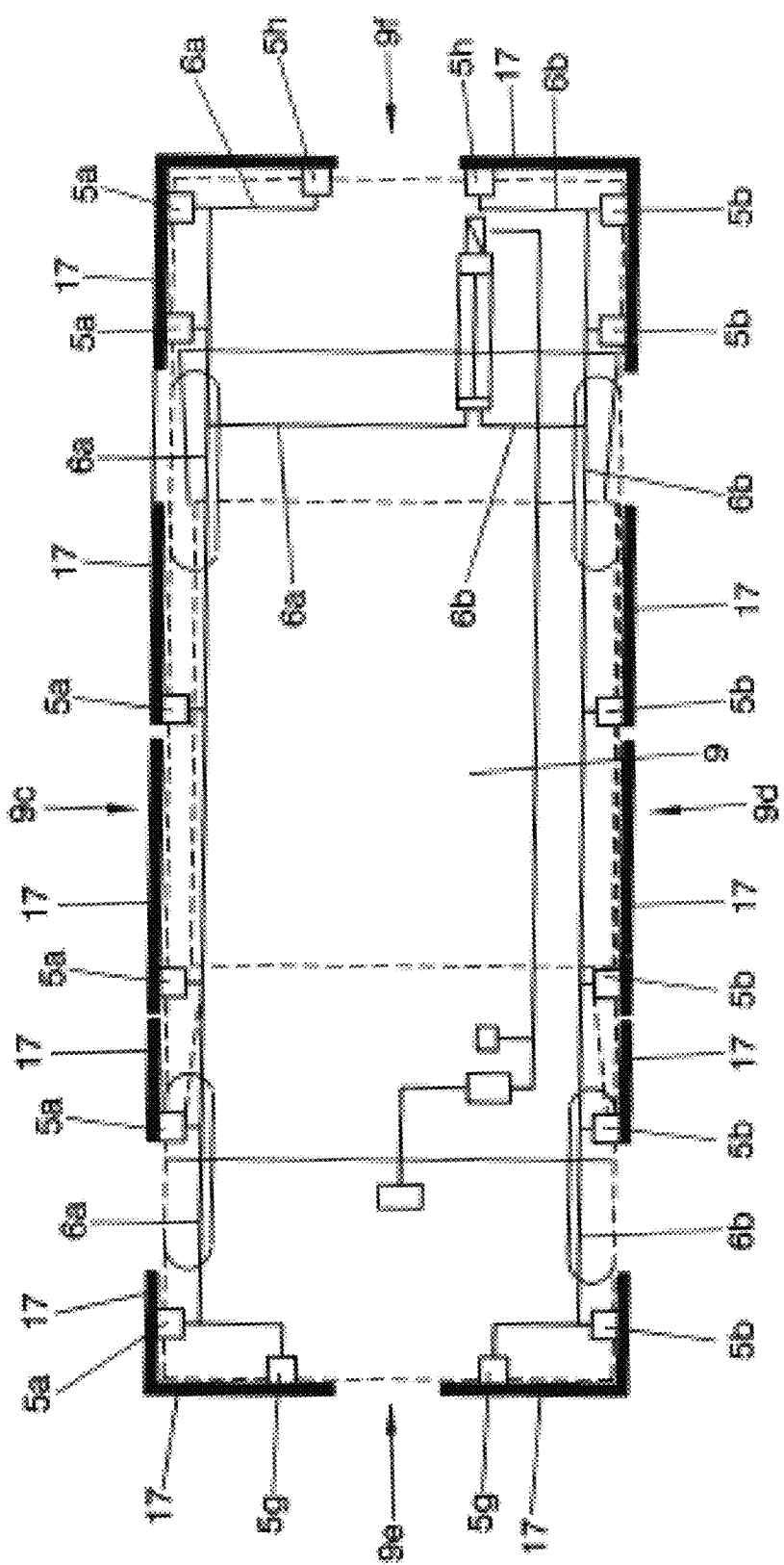
FIG. 6 is a schematic view in upper plan showing in greater detail the location and interrelation of the various components of the second embodiment of the signaling system shown in FIG. 6.
Figure 7:
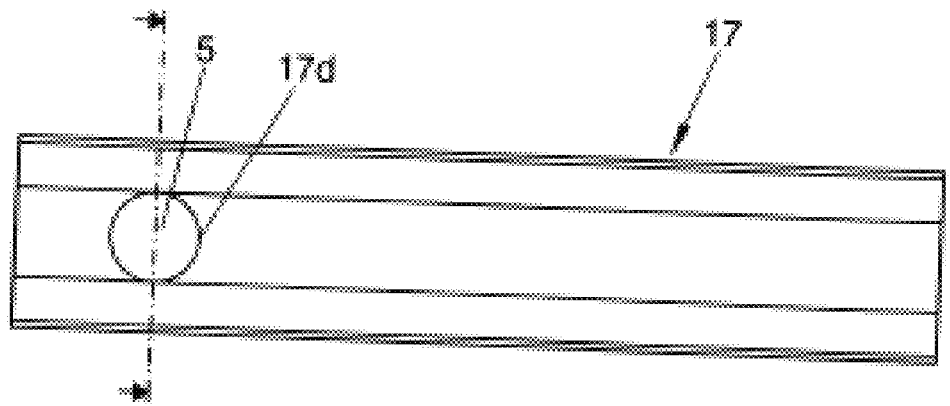
FIG. 7 is a front schematic view of an embodiment of a tank for the components of the chemoluminescent product which can be used in the second embodiment of the signaling system shown in FIGS. 6 and 7.
Figure 8:
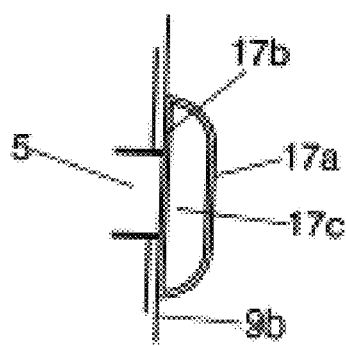
FIG. 8 is a schematic view in transverse cross-section of the tank shown in FIG. 7.
Figure 9:
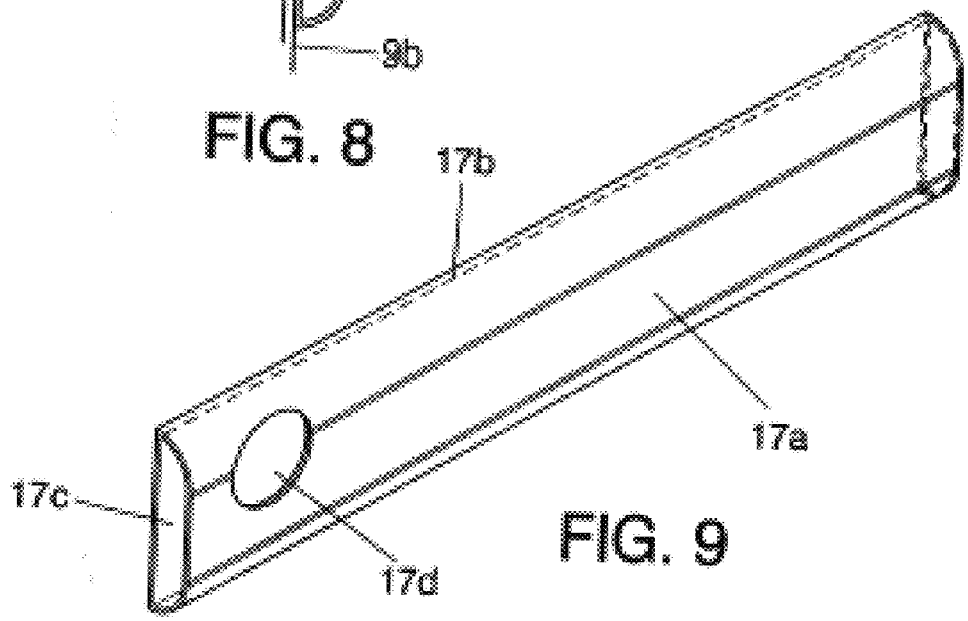
FIG. 9 is a schematic view in perspective of the tank shown in FIG. 7.

FIGS. 5 and 6 show a second embodiment of the invention, also applied to an automobile vehicle, in which the reservoirs, the impeller system, the mixing system and the receiving means of activation signals for the impeller system, and the timer, are the same as in the first embodiment shown in FIGS. 1 to 3 provided in the housing 13, but in which the mixing system 3 is connected to a right main duct 6a which extends along the interior of the vehicle 9 and which includes an array of right product outlets 5a in the external left side part 9c of the vehicle 9, along with an external left main duct 6b which extends along the interior of the vehicle 9 with an array of left product outlets 5b in the external left side part 9d of the vehicle 9. The right main duct 6a and the left main duct are also connected to separate front product outlets 5g and to separate rear product outlets. In turn, the product outlets 5a,5b lead to respective translucent product tanks 17 introduced into the side and front trim of the automobile vehicle. An example of those tanks can be seen in FIGS. 7 to 9. In the embodiment shown in those figures, the tank 17 is a piece of trim with an interior space 17c defined between a rear part 17b fixed to the external part of the vehicle body and a transparent or translucent front part 17a with a domed transverse cross-section, joined to the rear part 17b. Leading to the interior space 17c is at least one of the product outlets 5 via a filling inlet 17d provided in the rear part 17b of the tank 17 which is in turn fixed to the external part of the vehicle body.

Figure 10:
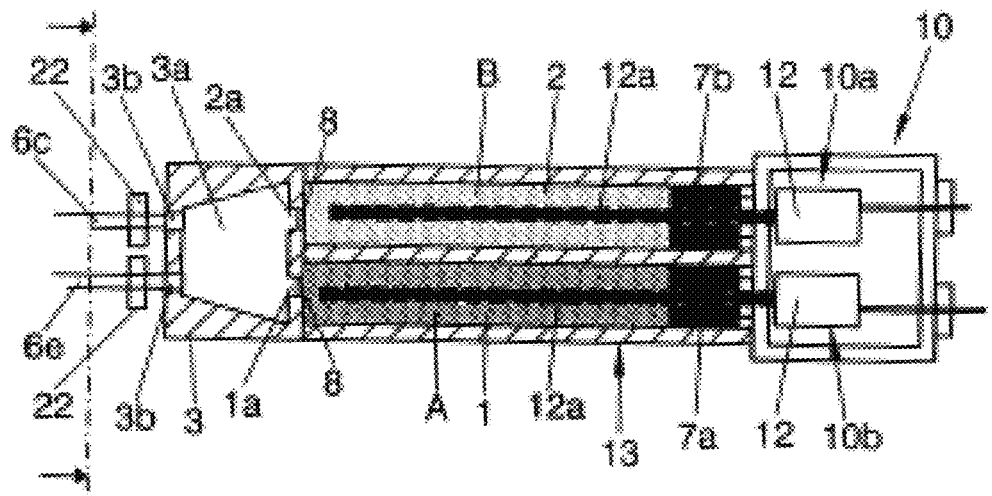
FIG. 10 is a schematic view sectioned in upper plan of a first embodiment of a device that includes the reservoirs, the mixing zone and the impeller system.
Figure 11:
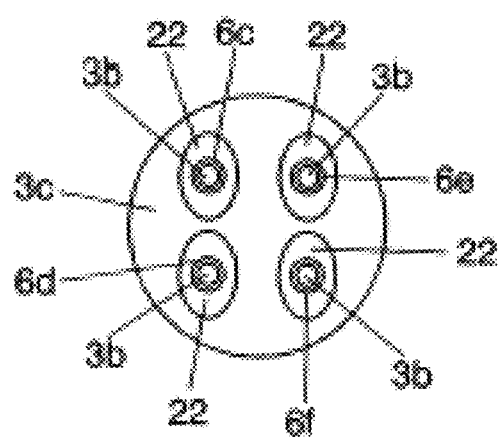
FIG. 11 is a front schematic view of the device shown in FIG. 10.
Figure 12:
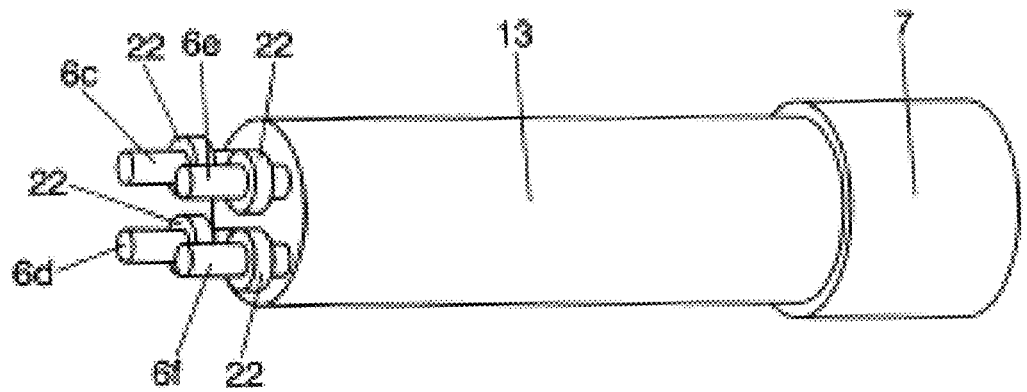
FIG. 12 is a schematic view in perspective of the device shown in FIG. 10.

The embodiment of the device that includes the reservoirs 1,2, the mixing system 3 and the impeller system 7 shown in FIGS. 10, 11 and 12 is applicable to the installation shown in FIGS. 1 to 3. It can be seen that in this embodiment, the device includes a first reservoir 1 for the first component A of the liquid chemoluminescent product C and a second reservoir 2 for the second component B of the chemoluminescent product C. The mixing system for mixing those components A,B in response to the activation signal for obtaining the chemoluminescent product C includes a mixing zone 3a in the form of a chamber in which said components A,B are mixed. The reservoirs 1,2 include separate evacuation outlets 1a,2a, respectively closed by sealing means 8 when the installation is in the inactive state shown in FIGS. 10 to 12.

The impeller system of the device includes means of actuation 10 for pushing a first plunger 7a in the first reservoir 1 towards the first evacuation outlet 1a and for pushing a second plunger 7b in the second reservoir 2 towards the second evacuation outlet 2a, when the impeller system 7 receives the actuation signal. The means of actuation include a first actuation device 10a for pushing the first plunger 7a and a second actuation device 10b for pushing the second plunger 7b. Each actuation device 10a,10b includes an electric motor 12 connected to a threaded shaft 12a which screws into the plunger 7a,7b to which it is associated. Given that the plungers 7a,7b are arranged in such a way that they rotate around in the respective reservoirs, the rotation of the shaft 12a actuated by the motor 12 causes the displacement of the plunger 7a,7b towards the evacuation outlets 1a,2a which, in turn, lead to the mixing zone 3a. In this way, when the motors 12 are activated, they simultaneously push both plungers 7a,7b towards the evacuation outlets 1a,2a and, after opening the sealing means 8, they cause the components A,B to penetrate in the mixing zone 3a where the chemoluminescent product C is formed. The front wall 3c of the mixing chamber 3a is provided with four throats 3b respectively connected to the upper right distribution duct 6c, the lower right distribution duct 6d, the upper left distribution duct 6e and the lower left distribution duct 6f, via separate electrovalves 22.

Figure 13:
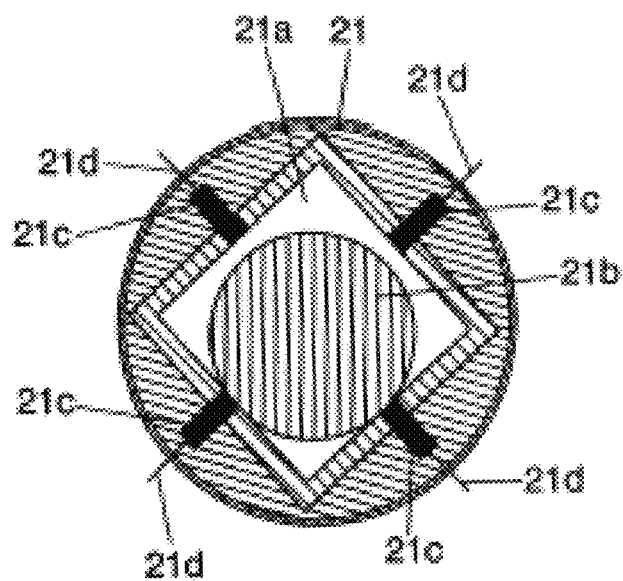
FIG. 13 is a schematic view in transverse cross-section of an embodiment of the opening selector for the electrovalves applicable to the device shown in FIGS. 10-12.
Figure 14:
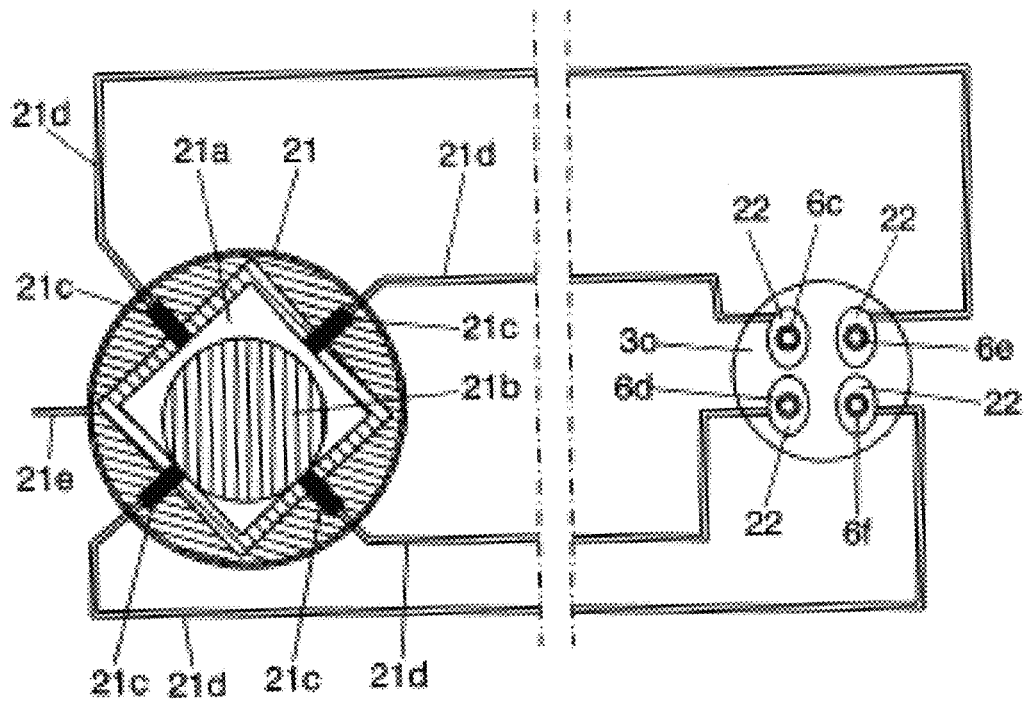
FIG. 14 is a schematic view showing an embodiment of the interconnection of the opening selector shown in FIG. 12 and the electrovalves of the device shown in FIGS. 10 and 11.
Figure 15:
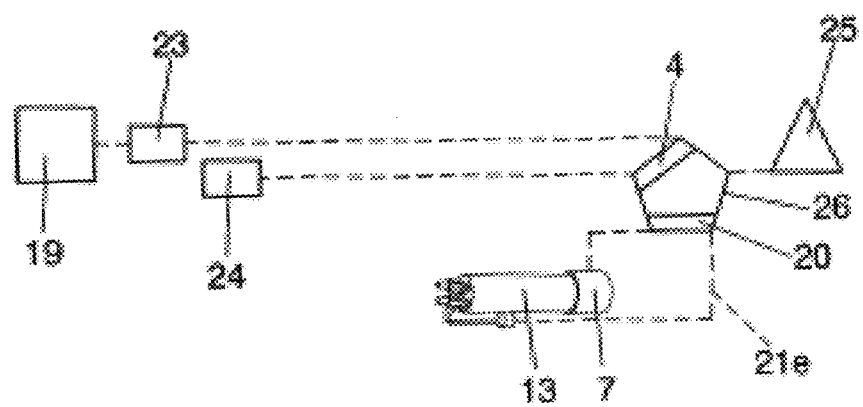
FIG. 15 is a an embodiment of the interrelation of the elements shown in FIGS. 10 to 14 with the other elements of the system.

In accordance with that shown in FIGS. 13 to 15, these electrovalves 22 are connected to an opening selector 21 for the electrovalves 22, with the aim of permitting a selection to be made of which of the distribution ducts 6c,6d,6e,6f are opened at the moment of expelling the chemoluminescent product C. The selector 21 includes an interior hole 21a of quadrangular transverse cross-section whose corners are respectively positioned in the upper part, the lower part, the right part and the left part of the hole 21a. Housed inside the interior hole 21a is a ball 21b made of a conducting material and which can be displaced inside that interior hole 21a. Provided in each of the side interior walls of the interior hole 21a is an electric switch 21c which is in turn connected via an electrical connection 21d to one of the electrovalves 22. Owing to the action of gravity, the ball 21b is at all times in the position of lower equilibrium, actuating the switches present there. In the embodiment shown in FIGS. 13 to 15, the switches are push-buttons which, when the ball rests on two of them that are in the lower position, this prevents the electrovalves 22 to which they are connected from becoming opened, so the chemoluminescent product enters into the distribution ducts in which the valves are to be found that have been closed by the action of these switches. In the case of the FIGS. 13 to 15, the closed electrovalves 22 are those to be found in the lower distribution ducts 6d,6f. In this way, when the vehicle has overturned onto one of its sides, the electrovalves 22 connected to the outlets of the side on which the vehicle is resting stay closed owing to the displacement of the ball 21b and the consequent actuation of the corresponding switches 21c, while the electrovalves 22 connected to the distribution ducts for the side that remains free stay open, while when the vehicle is turned over onto its roof the electrovalves 22 connected to the upper distribution ducts 6c,6e stay closed owing to the displacement of the ball 21b and the consequent actuation of the corresponding switches 21c while the lower distribution ducts 6d,6f stay open. In this way, the chemoluminescent product only exits through those outlets that are in elevated positions and they are therefore clearly visible for the effects of being marked with the chemoluminescent product.

Figure 16:
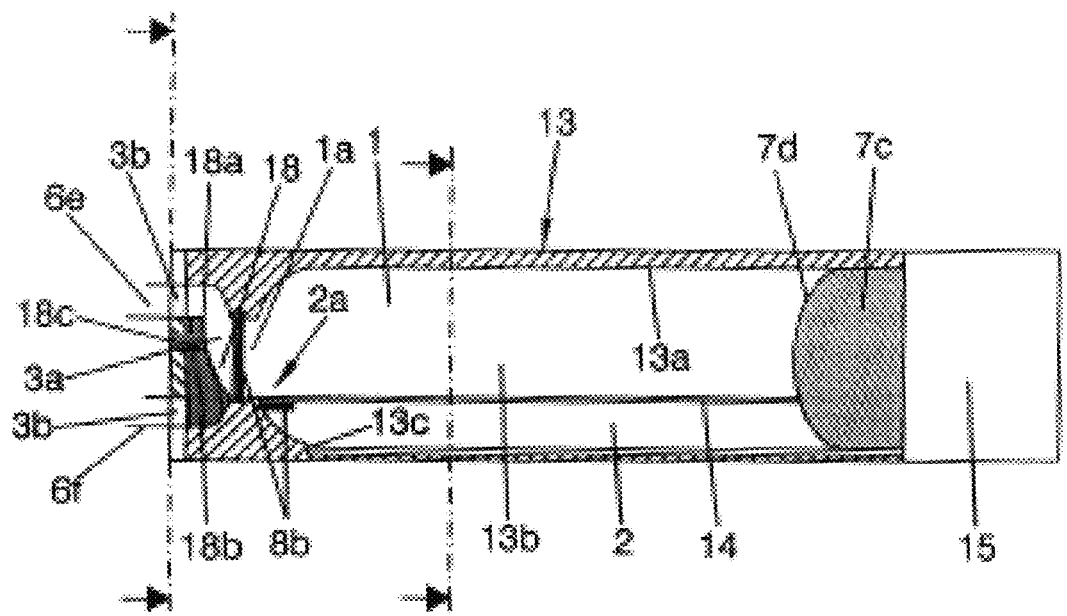
FIG. 16 is a schematic sideways view of a second embodiment of a device that includes the reservoirs, the mixing zone and the impeller system.
Figure 17:
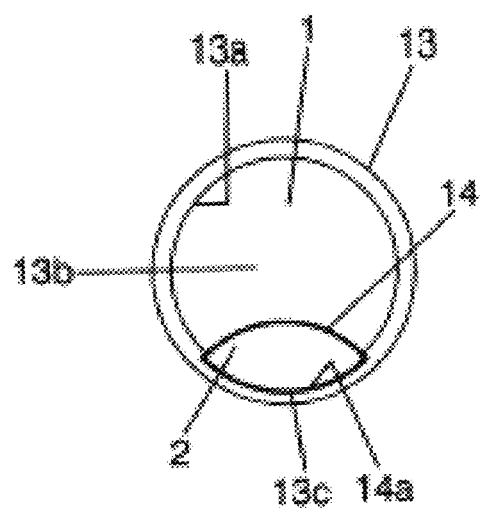
FIG. 17 is a schematic view in transverse cross-section of the device shown in FIG. 16.
Figure 18:
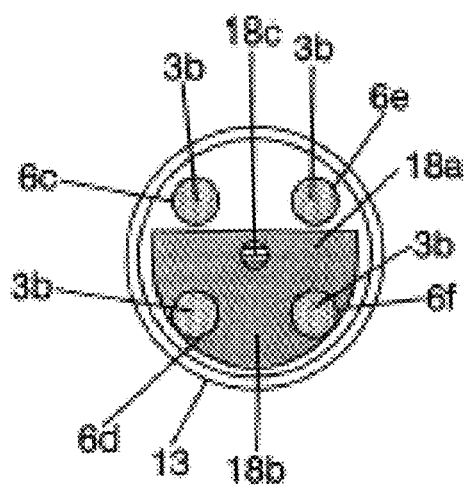
FIG. 18 is a front schematic view of the device shown in FIG. 16.

A second embodiment of the device that includes the reservoirs 1,2 which would also be directly applicable to the installation shown in FIGS. 1 to 3 is shown in FIGS. 16 to 18. In this second embodiment of the device, the reservoirs 1,2 are located in an interior chamber 13a of the housing 13, the first reservoir 1 being a first axial space 13b in the interior chamber 13a and the second reservoir 2 being a tubular receptacle 14 of the tubular receptacle made of a flexible plastic material backed by a part of its perimeter 14a onto a recess 13c in the interior wall of the interior chamber 13a. The impeller system in turn comprises a single plunger 7c that can be displaced in the interior chamber 13a and actuator means 15 for pushing the single plunger 7c towards the first evacuation outlet 1a when the impeller system 7 receives the actuation signal. The said single plunger 7c has a head 7d with a configuration of transverse cross-section that is complementary to the transverse cross-section of the interior chamber 13a, and its diameter becomes narrower in the direction towards the first evacuation outlet 1a. In this way, as the single plunger 7c advances towards the mixing zone, the head 7d of the single plunger 7c progressively pushes the first component A of the chemoluminescent product C present in the first reservoir 1 towards the mixing zone 3a in which it enters after breaking the sealing membrane 8b provided in the first evacuation outlet 1a, and likewise progressively compresses the second reservoir 2 in such a way that the second component B of the chemoluminescent product C, after breaking the sealing membrane 8b provided in the second evacuation outlet 2a, is progressively evacuated from the second reservoir 2 towards the mixing zone 3a. In the embodiment shown in FIGS. 16 to 18, the first reservoir 1 has a circular transverse cross-section and the second reservoir 2 has an ogive transverse cross-section that is less than half the transverse cross-section of the interior chamber 13a. It can also be seen in the embodiment of the device shown in FIGS. 16 to 18 that each distribution duct 6c,6d,6e,6f is connected to the mixing zone 3a via separate throats 3b which transverse the front wall of the housing 13, each throat 3b being able to be blocked by a blocking pendulum 18 provided in the mixing chamber 3a. This blocking pendulum 18 includes an upper part 18a, a lower part 18b heavier than the upper part 18a and a tilting shaft 18c between the lower part 18b and the upper part 18a. The lower part 18b of the blocking pendulum 18 is dimensioned in such a way that the throats 3b connected to the upper distribution ducts 6c,6e are left open and the lower distribution ducts 6d,6f are closed when the vehicle is in the horizontal position, while when the vehicle is in the overturned position it blocks those throats connected to the distribution ducts corresponding to the side on which the vehicle rests, or when the vehicle has overturned onto its roof it closes the throats 3b connected to the upper distribution outlets 6c,6e and leaves the lower distribution outlets 6d,6f open. In this way too, the chemoluminescent product only exits through those outlets that are in elevated positions and therefore clearly visible for the purposes of its marking with the chemoluminescent product.

Figures 19A, 19B:
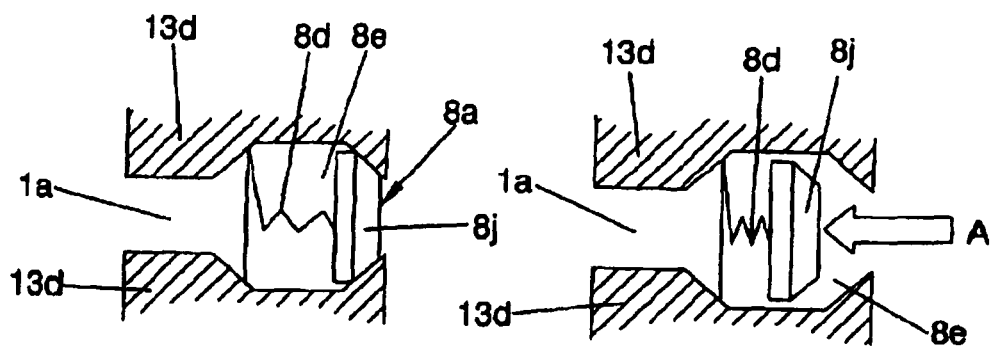
FIGS. 19A and 19B are schematic views in transverse cross-section showing a first embodiment of some sealing means that can be used in the device shown in FIGS. 10-12.

FIGS. 19A and 19B illustrate an embodiment of the sealing means 8 of the first evacuation outlet 1a in the wall 13d of the interior chamber 13 corresponding to the first reservoir 1 of the device shown in FIGS. 10-12. Specifically, the sealing means consist of an automatic valve 8a containing a plug 8j of trunco-conical cross-section and arranged in a widening 8e of the evacuation outlet 1a, aided by a helical spring 8d. When, as shown in FIG. 19B, the means of actuation push the plunger towards the evacuation outlet 1a, the pressure exerted by the first component A of the chemoluminescent product pushes the plug 1j towards the front, against the force of the spring 8d, in such a way that the first component A flows through the widening 8e toward and through the evacuation outlet 1a. When the first component A ceases to exert sufficient pressure on the plug, the plug 1j returns to its sealed position shown in FIG. 19A. Obviously, the automatic valve 8a shown in the FIGS. 19A and 19B can also be applied by analogy to the second evacuation outlet 2a of the second reservoir shown in FIGS. 10-12.

Figures 20A, 20B:
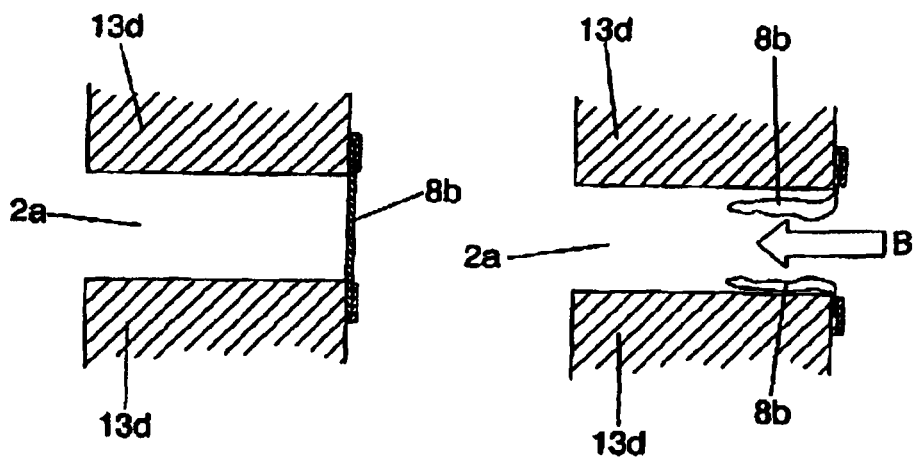
FIGS. 20A and 20B are schematic views in transverse cross-section showing a second embodiment of some sealing means that can be used in the device shown in FIGS. 10-12.

FIGS. 20A and 20B illustrate another embodiment of the sealing means 8 of the second evacuation outlet 2a in the front wall 13d of the interior chamber 13 corresponding to the first reservoir 1 of the device shown in FIGS. 10-12, though it would also by analogy be applicable to the first evacuation outlet 1a of the device shown in FIG. 16. As shown in FIG. 20A, in this embodiment the sealing means includes a breakable membrane 8b provided in the evacuation outlet 2a in such a way that it seals said outlet 2a. When, as shown in FIG. 20B, the means of actuation push the plunger towards the evacuation outlet 2a, the pressure exerted by the second component B of the chemoluminescent product breaks the membrane 8b, in such a way that the second component B can flow freely through the evacuation outlet 1a. Obviously, the membrane 8b shown in the FIGS. 20A and 20B can also be applied by analogy to the first evacuation outlet 1a of the first reservoir shown in FIGS. 10-12.

Figure 21:
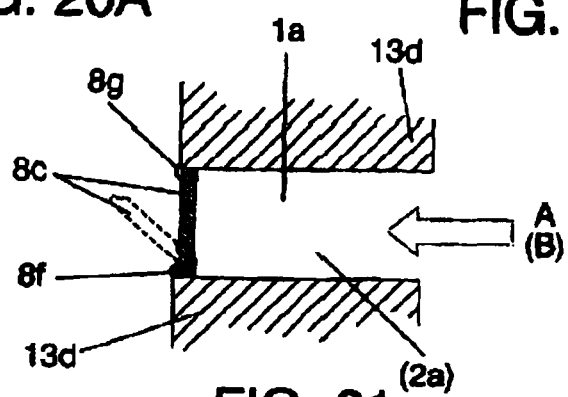
FIG. 21 is a schematic view in transverse cross-section showing a third embodiment of some sealing means that can be used in the device shown in FIGS. 10-12.

FIG. 21 shows another embodiment of the sealing means 8 for the first and/or second evacuation outlet 1a,2a in the front wall 13d of the reservoirs 1,2 of the device shown in FIG. 10-12. In this embodiment, the sealing means comprise a flap 8c attached to the front wall 13d by means of a hinge 8f and retained in its opposite part by a retention flange 8g. When the means of actuation are pushing the corresponding plunger towards the evacuation outlet 1a,2a the pressure exerted by the component A,B of the chemoluminescent product overcomes and breaks the retaining force of the flange 8g such that, as marked by the line of dashes, the flap 8c opens and the component A,B can flow freely through the evacuation outlet 1a,2a.

Figure 22:
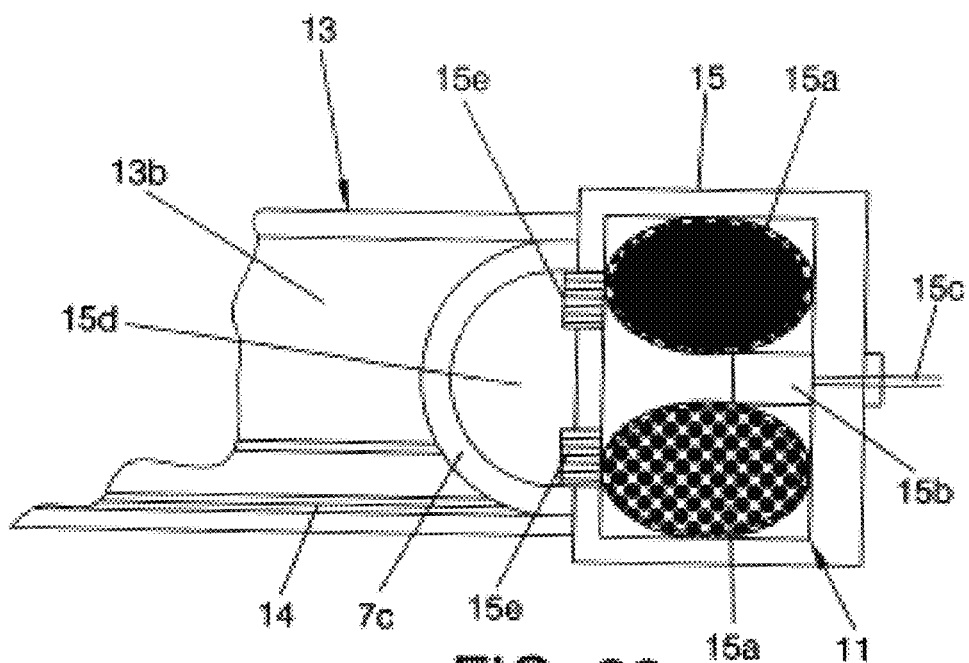
FIG. 22 is a schematic view in transverse cross-section of a first embodiment of an impeller system that can be used in the device shown in FIGS. 16-18.
Figure 23:
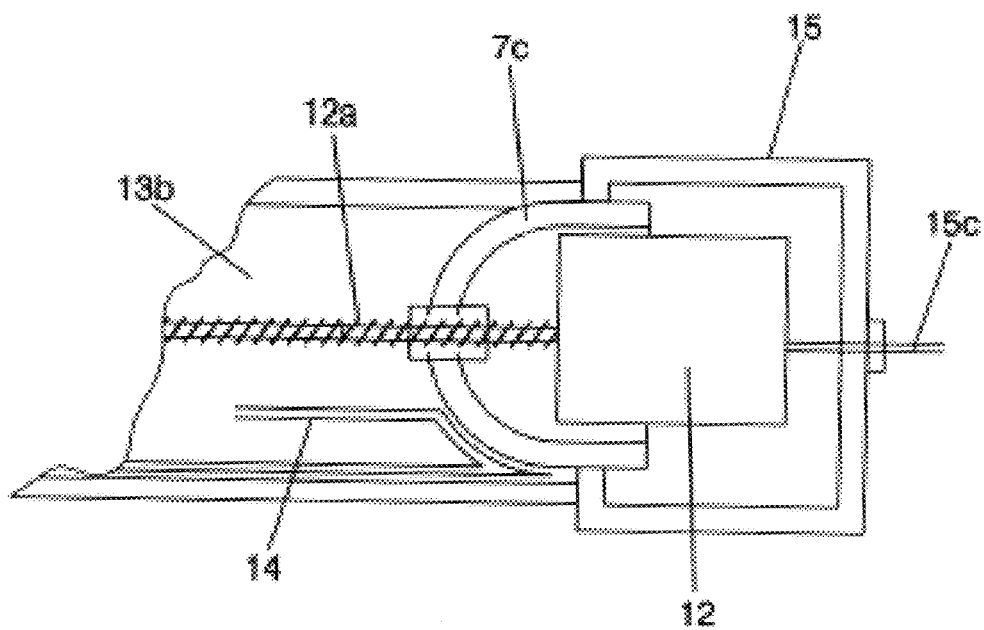
FIG. 23 is a schematic view in transverse cross-section of a second embodiment of an impeller system that can be used in the device shown in FIGS. 16-18.

FIGS. 22 and 23 show two embodiments of two actuator means 15 of the single plunger 7c corresponding to the device shown in FIG. 16.

In the embodiment shown in FIG. 22, the actuator means 15 include a pyrotechnic device 11 for pushing the single plunger 7c. The pyrotechnic device 11, conventional in itself, includes an array of tanks 15a of generator material of a propellant gas provided in an internal cavity linked to an interior cavity 15d in the rear part of the single plunger 7c. Provided between the tanks 15a is an ignition fuse 15b connected to an electrical connection 15c. When the fuse 15b receives an electrical impulse it becomes activated and causes, also in a way conventional in itself, the generator material of the propellant gas to react explosively releasing the propellant gas which exits suddenly and with great force through the outlet 15e pushing the single plunger and, therefore, the components of the chemoluminescent product towards the evacuation outlets.

In the embodiment of the actuator means shown in FIG. 23, they comprise of an electric motor 12 connected to a threaded shaft 12a which screws into the plunger 7c. The motor 12 is connected to an electrical power supply source such as a battery for example (not shown in FIG. 23) by means of an electrical connection 15c in such a way that, when the motor 12 is connected to the supply source, the rotation of the motor causes the threaded shaft 12a to rotate. Since the plunger 7c is arranged in such a way that it cannot turn inside the housing 13, the rotation of the shaft 12a driven by the motor 12 causes the plunger 7c to be displaced towards the evacuation outlets and, therefore, the evacuation of the components of the chemoluminescent product towards the product outlets.

Figure 24:
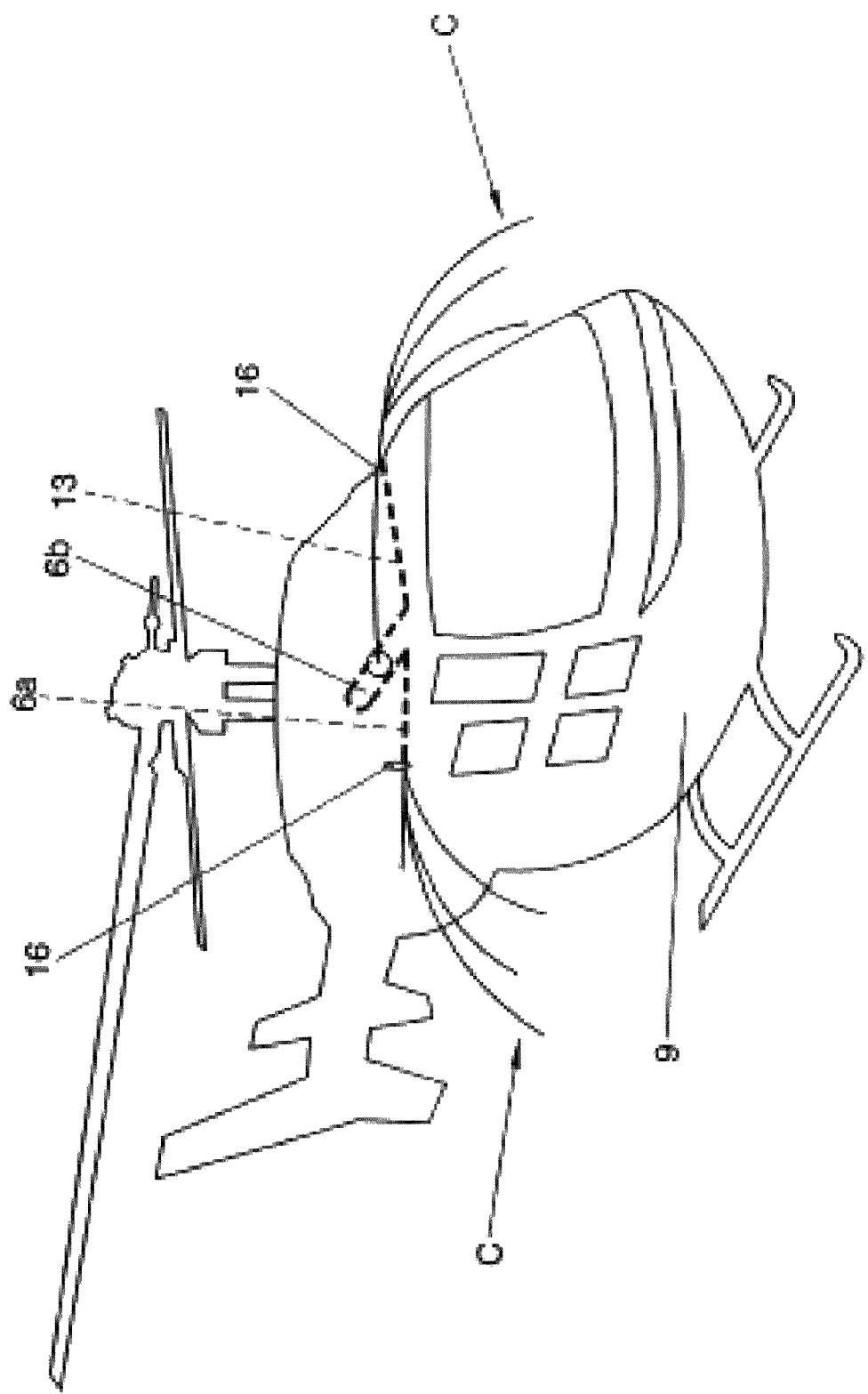
FIG. 24 is a schematic view in perspective of an application of the system of the present invention to a helicopter.

FIG. 24 shows an embodiment in which an installation according to the present invention is applied to an aircraft, particularly to a helicopter. In this embodiment, the housing 13 containing the reservoirs and the impeller system is provided in the upper part of the helicopter. The impeller system is connected to the product outlets fitted with spray nozzles 16 respectively arranged in the upper right part and in the upper left part via a right main duct 6a and a left main duct 6b.

Figure 25:
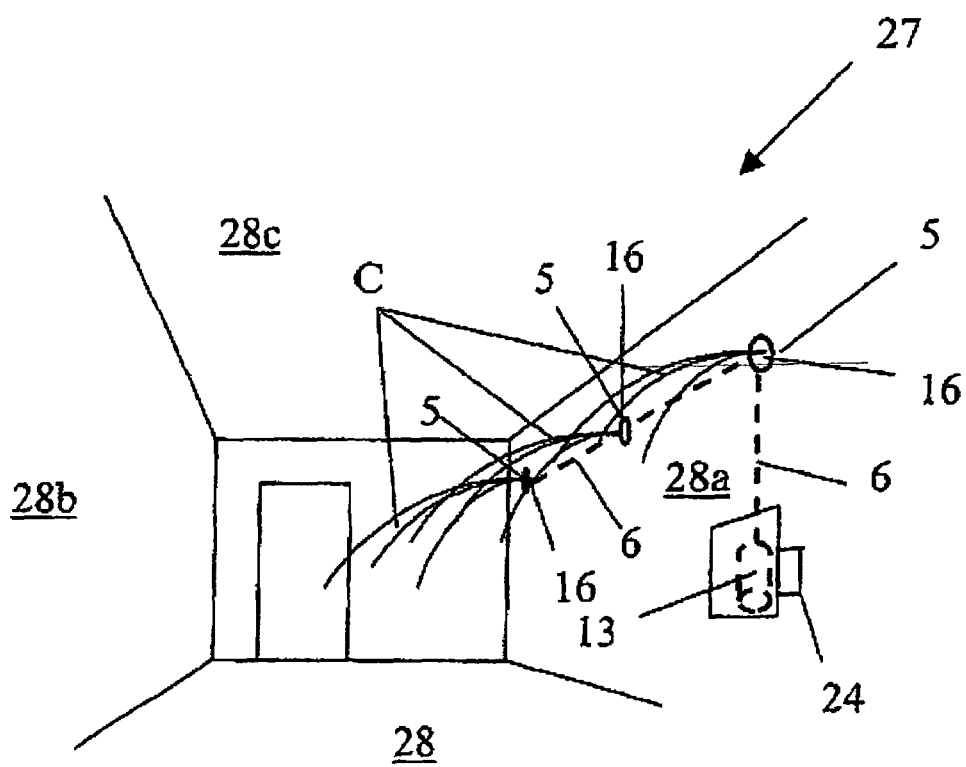
FIG. 25 is a schematic view in perspective of an application of the system of the present invention to an interior space of a building.

FIG. 25 illustrates an embodiment of the installation applied to the interior of a construction 27, such as for example a building or a ship, and more specifically in a corridor 28. It can be seen that the housing 13 contains the reservoirs and the impeller system and is provided in a gap in the right wall 28a of the corridor 28 and connected to the product outlets 5 which are fitted with spray nozzles 16 by means of the distribution system 6. Evidently, the product outlets 5 could also be provided in the left wall 28b or in the ceiling 28c of the corridor 28. The activation of the installation can be automatic by means of a detector (not shown in FIG. 25) which activates the installation in the absence of light for more than a defined period of time, or by means of a manual actuation control 24 which can be operated by a person who is in the corridor 28.

Figure 26:
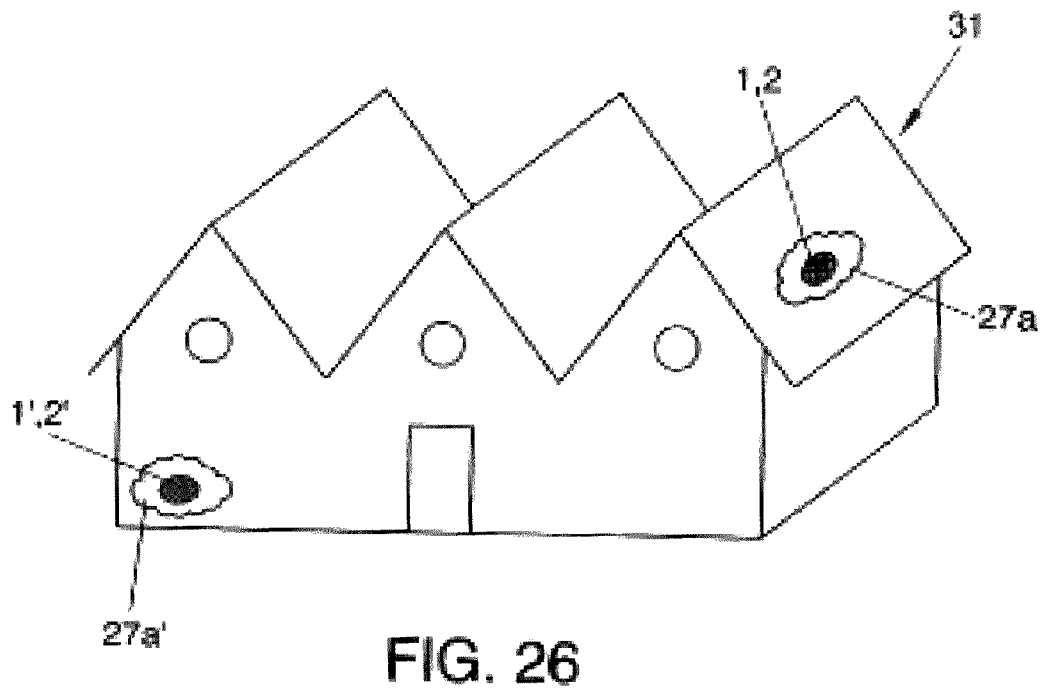
FIG. 26 is a schematic view in perspective of examples of locations of the reservoirs of the system of the present invention in a construction, specifically in a building.

FIG. 26 shows possible locations of the device with the reservoirs in a building 31. So, the reservoirs 1,2, 1',2' can be arranged in an upper zone 27a of the building and/or in a lower zone 27a'. Analogously, in FIG. 27 in which the installation of the present invention is applied to a ship 32, the reservoirs 1,2, 1',2' can be arranged in an upper zone 27a of the ship and/or in a lower zone 27a' of the ship.

Figure 27:
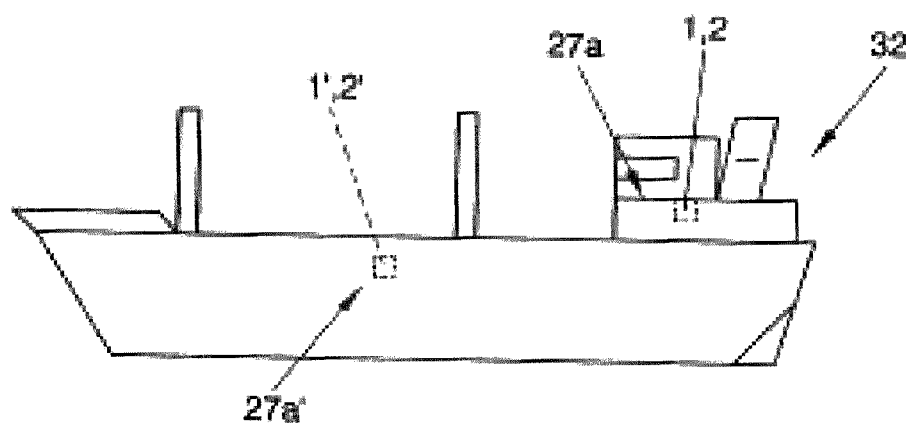
FIG. 27 is a sideways schematic view of examples of locations of the reservoirs of the system of the present invention in a construction, specifically in a ship.
Figure 28:
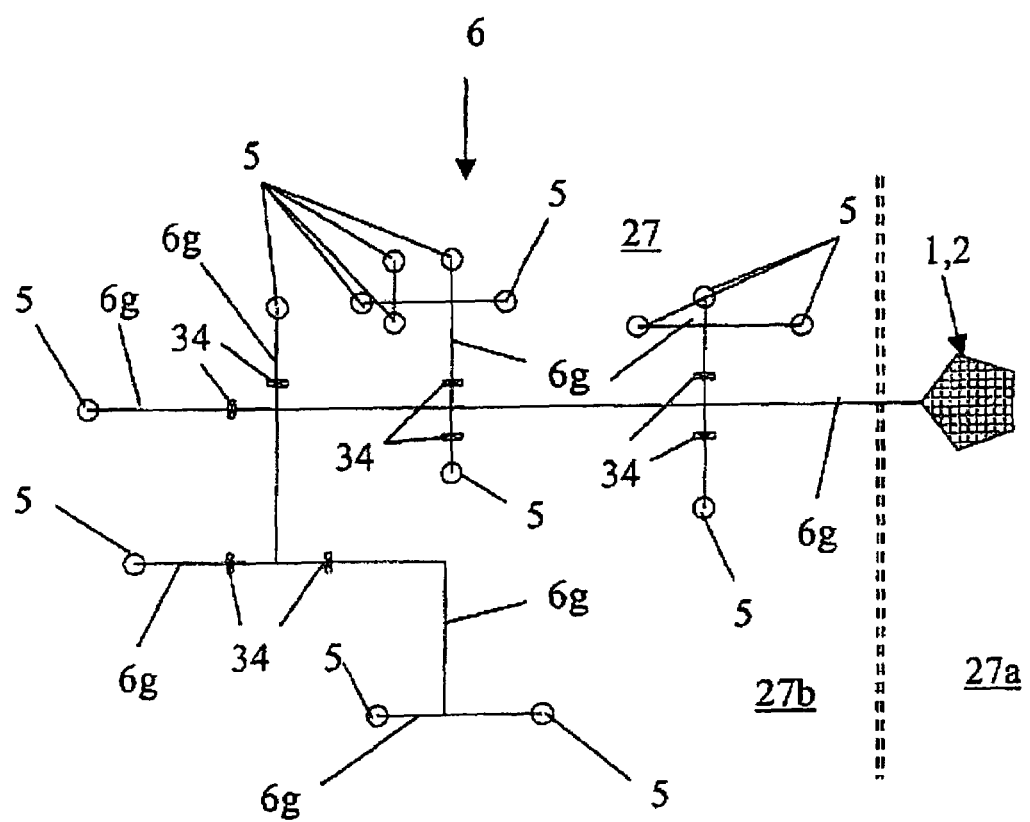
FIG. 28 is a schematic view in upper plan of an application of the system of the present invention in a construction.

FIG. 28 illustrates an embodiment of the installation applicable to constructions, such as for example the building 31 of FIG. 26 or to the ship 32 of FIG. 27. In the embodiment that is shown, the reservoirs 1,2 are provided in a first zone 27a of the construction while the product outlets 5 are housed in a second zone of the construction. The reservoirs 1,2 are connected to the product outlets 5 via the distribution system 6 comprising of pipes 6h. Provided in the branches of the distribution system 6 are some electrical distribution valves 34, controllable by means of a central control system (not shown in FIG. 28), by means of which the chemoluminescent product can be led to those areas where the emergency lighting is really needed.

FIGS. 29 to 35 illustrate various possible embodiments of how the reservoirs can be arranged in the embodiment of the installation shown in FIG. 28.

Figure 29:
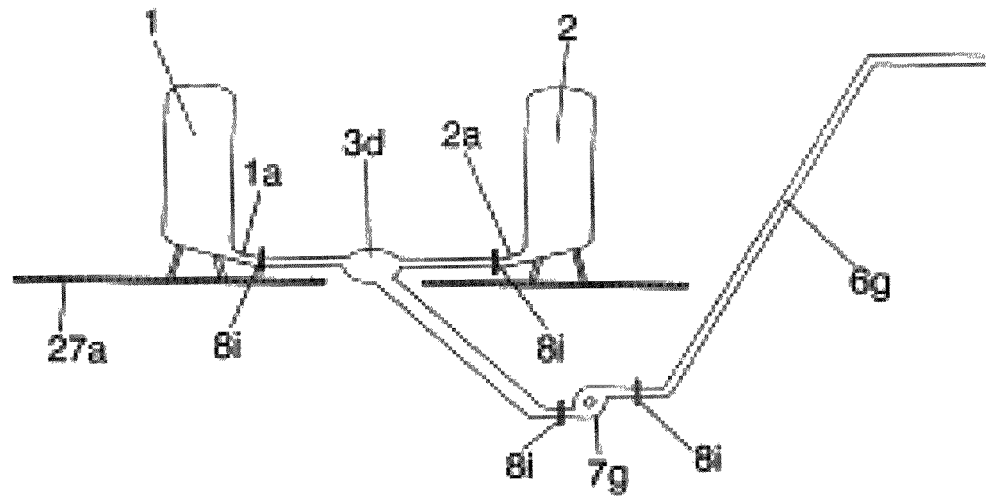
FIG. 29 is a schematic view in side elevation of a first arrangement of the reservoirs of the system of the present invention in a construction.

So, in the embodiment shown in FIG. 29, the reservoirs 1,2 are separate tanks whose lower parts contain respective evacuation outlets 1a,2a which are linked to the mixing chamber 3d provided in a plane lower than the plane of the evacuation outlets 1a,2a via ducts in which separate cutoff valves 8i are inserted. The mixing chamber 3d is in turn connected to various product outlets (see FIG. 28) via the pipe 6g whose initial section includes an electric impeller pump 7g with additional cutoff electrovalves 8i inserted in its intake and outlet.

Figure 30:
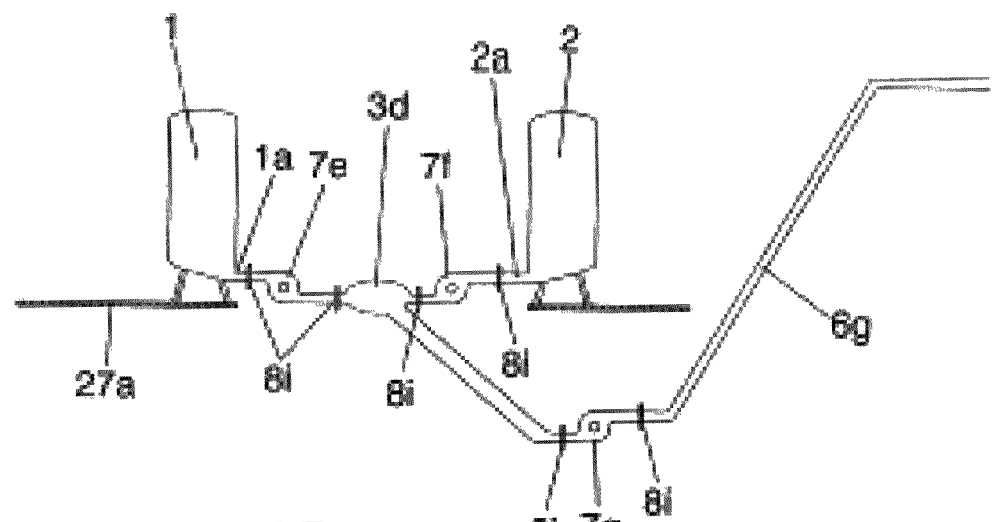
FIG. 30 is a schematic view in side elevation of a second arrangement of the reservoirs of the system of the present invention in a construction.

The embodiment shown in FIG. 30 is similar to that of FIG. 29, with the exception that the duct which links the first evacuation outlet 1a with the mixing chamber 3d is fitted with a first electric pump 7e and in which the duct which links the second evacuation outlet 2a with the mixing chamber 3d is fitted with a second electric pump 7f.

Figure 31:
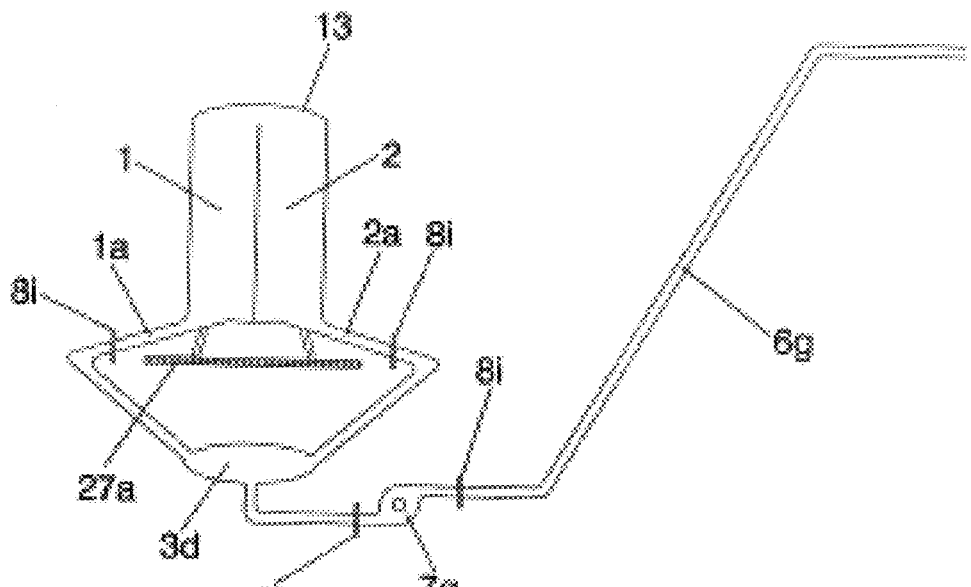
FIG. 31 is a schematic view in side elevation of a third arrangement of the reservoirs of the system of the present invention in a construction.

The embodiment shown in FIG. 31 is differentiated from the embodiment shown in FIG. 29 solely in that the reservoirs 1,2 are provided in the housing 13.

Figure 32:
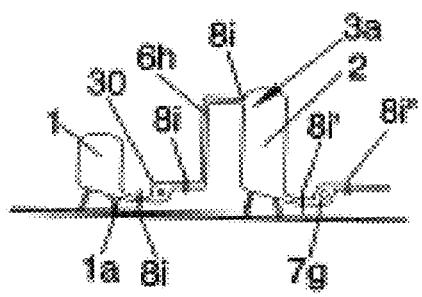
FIG. 32 is a schematic view in side elevation of a fourth arrangement of the reservoirs of the system of the present invention in a construction.

In FIG. 32, another embodiment can be seen in which the evacuation outlet 1a of the first tank 1 is connected via a decanting duct 6h to an inlet opening 2b in the upper part of the second reservoir 2, in such a way that the mixing zone 3a is located in the second reservoir 2 as a continuation of the inlet opening 2b. The decanting duct 8h is provided with an electrovalve 8i and an electric decanting pump 30, such that, when the installation is activated, the pump 30 pumps the first component of the chemoluminescent product from the first reservoir 1 to the interior of the second reservoir 2 in which the second component of the chemoluminescent is found, so that the two components mix and react so as to form the chemoluminescent product, which is then evacuated through the second evacuation outlet 2a of the second reservoir when the impeller electric pump 7g is started up (after having opened the electrovalves 8i',8i"), which impels the chemoluminescent product towards the product outlets.

Figure 33:
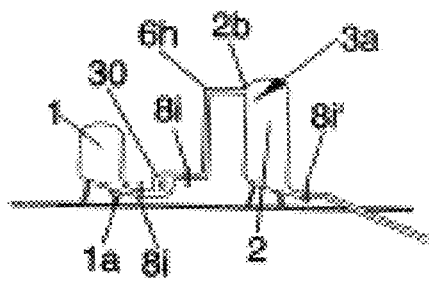
FIG. 33 is a schematic view in side elevation of a fourth arrangement of the reservoirs of the system of the present invention in a construction.

The embodiment shown in FIG. 33 is differentiated from the embodiment of FIG. 32 only in that it lacks the impeller electric pump 7g, so that the chemoluminescent product reaches the product outlets by flowing under gravity though the decanting duct 6h. This embodiment is feasible when the reservoirs 1,2 are arranged in an upper zone of the construction, as are for example the zones 27a in the constructions shown in FIGS. 26 and 27.

Figure 34:
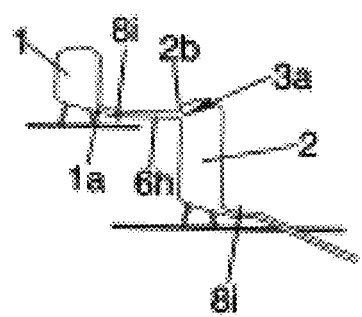
FIG. 34 is a schematic view in side elevation of a fifth arrangement of the reservoirs of the system of the present invention in a construction.

The embodiment shown in FIG. 34 is differentiated from that of FIG. 33 in that the evacuation outlet 1a of the first reservoir 1 is provided in a plane higher than the inlet 2b of the second reservoir 2, in such a way that the impeller electric pump 7g can be dispensed with for decanting the first component of the chemoluminescent product to the second reservoir via the decanting duct 6h.

Figure 35:
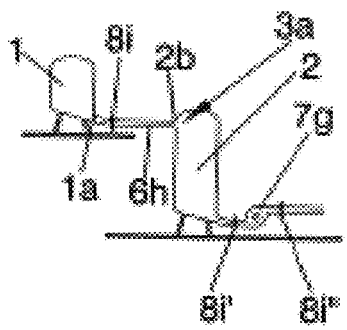
FIG. 35 is a schematic view in side elevation of a sixth arrangement of the reservoirs of the system of the present invention in a construction.

Finally, the embodiment shown in FIG. 35 is differentiated from the embodiment of FIG. 34 only in that the duct connected to the evacuation outlet 2a of the second reservoir is connected to an impeller electric pump 7g in such a way that the embodiment of FIG. 35 can be used in installations in which the reservoirs 1,2 are provided in zones with equal or lower planes than at least part of the product outlets, such as for example the zones 27a' shown in FIGS. 26 and 27.

In the embodiments shown in FIGS. 32 to 35, it is clear that, before the second evacuation outlet 2a can be opened, the chemoluminescent product must have been formed completely by reaction of the first component decanted into the second reservoir with the second component, for which these components have to be allowed to be in contact with each other for a sufficient period of time so that this reaction can take place.

Figure 36:
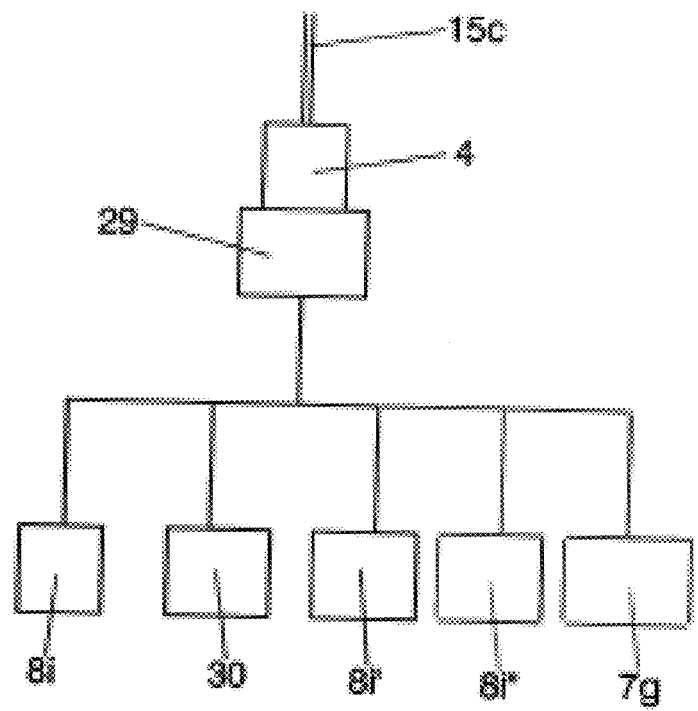
FIG. 36 is a schematic view of an embodiment of the activation circuit for the arrangement shown in FIGS. 32 and 33.

FIG. 36 schematically illustrates an activation circuit for the devices shown in FIGS. 32 and 33, with the parts that are applicable just to FIG. 32 being shown in dotted lines. Interconnected between the receiving means for activation signals 4 are some generator means of sequential orders for activation 29 which are in turn connected to the electrovalves 8i arranged in the decanting duct 6h, to the first electrovalve 8i' connected to the outlet 2a of the second reservoir 2 and, as shown with the line of dots for the case of the embodiment of FIG. 32, to the second electrovalve 8i''' and to the impeller electric pump 7g.

When the receiving means 4 receive the activation signal for the installation via the electrical connection 15c, the generator means of sequential orders for activation 29 emit an opening order to the first electrovalves 8i arranged in the decanting duct 6h, and then a second activation order for the pump 30, so that the first component of the chemoluminescent product can be decanted to the second reservoir 2. The two components are kept in the second reservoir for a sufficient length of time for the components to react and form the chemoluminescent product. In order to permit a sufficient duration for the reaction, the generator means 29 do not generate an opening order to the electrovalve 8i' (and in the case of the embodiment of FIG. 32, an opening order to the electrovalve 8i''' and an activation order to the pump 7g) connected to the outlet 2a of the second reservoir 2 until a predetermined length of time has passed. Only after that period of time which guarantees the formation of the chemoluminescent product do the generator means 29 generate those orders so as to permit the evacuation of the chemoluminescent product formed in the second reservoir 2.

Figure 37:
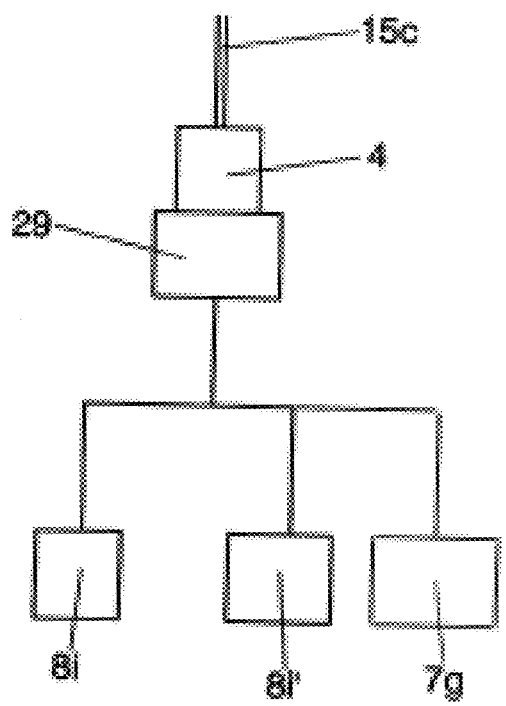
FIG. 37 is a schematic view of an embodiment of the activation circuit for the arrangement shown in FIGS. 34 and 35.

The FIG. 37 schematically illustrates an activation circuit for the devices shown in FIGS. 34 and 35, with the parts that are applicable just to FIG. 35 being shown in dotted lines. For these embodiments the generator means of sequential orders for activation 29 are connected to the electrovalve 8i arranged in the decanting duct 6h, to the first electrovalve 8i' connected to the outlet 2a of the second reservoir 2 and, as shown with the line of dots for the case of the embodiment of FIG. 35, to the second electrovalve 8i''' and to the impeller electric pump 7g.

When the receiving means 4 receive the activation signal for the installation via the electrical connection 15c, the generator means of sequential orders for activation 29 emit an opening order to the electrovalve 8i arranged in the decanting duct 6h so that the first component of the chemoluminescent product can be decanted to the second reservoir 2. The two components are kept in the second reservoir for a sufficient length of time for the components to react and form the chemoluminescent product. In order to permit a sufficient duration for the reaction, the generator means 29 incorporate a timer which does not generate an opening order to the electrovalve 8i' (and in the case of the embodiment of FIG. 35, an opening order to the electrovalve 8i''' and an activation order to the pump 7g) connected to the outlet 2a of the second reservoir 2 until a predetermined length of time has passed. Only after that length of time which guarantees the formation of the chemoluminescent product do the generator means generate 29 those orders so as to permit the evacuation of the chemoluminescent product formed in the second reservoir 2.

The invention claimed is:

1. An emergency lighting installation of a vehicle, comprising:
   at least one first reservoir for a first component of a liquid chemiluminescent product,
   at least one second reservoir for a second component of a liquid chemiluminescent product,
   a mixing system which includes receiving means of an activation signal, for mixing said components in response to the activation signal in order to obtain the chemiluminescent product, along with a mixing zone in which said components are mixed,
   sealing means which seal the reservoirs when the installation is not activated by the activation signal;
   a distribution system having a plurality of distribution ducts for connecting the reservoirs to a plurality of product outlets in remote zones of the vehicle; and
   the mixing system furthermore includes an evacuation system configured to be activated by the activation signal, the evacuation system connected to the reservoirs for mixing said components of the chemiluminescent product and configured to evacuate the components of the chemiluminescent product in order to impel the chemiluminescent product obtained following the mixing of said components via the distribution system towards the product outlets,
   wherein the installation further includes:
   impact detector means which transmit the activation signal to the receiving means based on detecting an impact suffered by the vehicle having an intensity greater than the rated impact.

2. Installation according to claim 1, wherein the first reservoir includes at least one first evacuation outlet and the second reservoir includes at least one second evacuation outlet, the evacuation outlets being respectively closed by the sealing means when the installation is in the inactive state.

3. Installation according to claim 2, wherein the evacuation system includes an impeller system which contains
   a first plunger displaceable in the first reservoir towards the first evacuation outlet,
   a second plunger displaceable in the second reservoir towards the second evacuation outlet and
   means of actuation in order to push the plungers towards the evacuation outlets when the impeller system receives the actuation signal.

4. Installation according to claim 3, wherein the means of actuation comprises at least one pyrotechnic device for pushing at least one of said plungers.

5. Installation according to claim 4, wherein the means of actuation simultaneously push both plungers towards the evacuation outlets and in that the evacuation outlets lead to the mixing zone.

6. Installation according to claim 3, wherein the means of actuation comprises at least one electric motor for pushing at least one of said plungers.

7. Installation according to claim 3, wherein
the first evacuation outlet of the first reservoir is connected to an inlet opening of the second reservoir;
the mixing zone is located in the second reservoir as a continuation of the inlet opening;
the means of actuation include a first actuation device (10a) for pushing the first plunger towards the first evacuation outlet and a second actuation device (10b) for pushing the second plunger towards the second evacuation outlet;
the impeller system includes generator means for sequential orders for activation connected to the receiving means;
when the receiving means have received an activation signal, the generator means generate
a first activation order which activates the first actuation device (10a) for pushing the first plunger towards the first evacuation outlet in response to the first order in such a way that the first component of the chemiluminescent product is decanted to the second reservoir via the inlet opening in order to mix the first component with the second component in order to form the chemiluminescent product in the second reservoir, and
a second activation order, generated when the first component has been at least partially decanted to the second reservoir, which activates the second activation device (10b) for pushing the second plunger towards the second evacuation outlet in response to the second order, evacuating chemiluminescent product via the second evacuation outlet.

8. Installation according to claim 7, wherein the mixing zone is a mixing chamber to which the evacuation outlets lead; and in that the distribution system includes
at least one right main duct which extends along the interior of the vehicle and links the mixing zone with at least one right product outlet in a right lateral part of the external part of the vehicle;
and at least one left main duct which extends along the interior of the vehicle and links the mixing zone with at least one left product outlet in a left lateral part of the external part of the vehicle.

9. Installation according to claim 8, wherein at least one of the upper product outlets is situated in the upper part of the vehicle.

10. Installation according to claim 8, wherein at least one of the lower product outlets is situated in the lower part of the vehicle.

11. Installation according to claim 8, wherein it includes at least one front product outlet linked to one of the ducts.

12. Installation according to claim 8, wherein it includes at least one rear product outlet linked to one of the ducts.

13. Installation according to claim 8, wherein
each duct is connected to the mixing chamber via separate throats which pass through a front wall of the mixing chamber;
each throat is able to be blocked by a blocking pendulum provided in the mixing chamber;
the blocking pendulum comprises an upper part, a lower part heavier than the upper part and a tilting shaft between the lower part and the upper part;
the lower part of the blocking pendulum is dimensioned for allowing at least one of said throats to be free when the vehicle is in the horizontal position, and for blocking at least one of said throats when the vehicle is in an overturned position.

14. Installation according to claim 2, wherein the evacuation system includes an impeller system and wherein
the reservoirs are located in an interior chamber of a housing;
the first reservoir is a first axial space in the interior chamber;
the second reservoir is a tubular receptacle made of a flexible plastic material backed by a part of its perimeter onto a recess in the interior wall of the interior chamber;
the impeller system comprises a single plunger that can be displaced in the interior chamber and actuator means for pushing the single plunger towards the first evacuation outlet when the impeller system receives the actuation signal;
the single plunger has a head with a configuration of transverse cross-section that is complementary to the transverse cross-section of the interior chamber and whose diameter narrows in direction towards the first evacuation outlet, in such a way that as the single plunger advances towards the mixing zone, the head of the single plunger progressively pushes the first component of the chemiluminescent product present in the first reservoir towards the mixing zone and progressively compresses the second reservoir in such a way that the second component of the chemiluminescent product is progressively evacuated from the second reservoir towards the mixing zone.

15. Installation according to claim 14, wherein the first reservoir has a circular transverse cross-section and the second reservoir has an ogive transverse cross-section.

16. Installation according to claim 14, wherein the second reservoir has a transverse extension that is less than half the transverse cross-section of the interior chamber (13a).

17. Installation according to claim 14, wherein the actuator means of the impeller system include a pyrotechnic device for pushing the single plunger.

18. Installation according to claim 14, wherein the actuator means include at least one electric motor for pushing the single plunger.

19. Installation according to claim 2, wherein the installation is provided as part of a construction, and in that the distribution system includes an array of pipes via which the evacuation outlets of the reservoirs are connected to the product outlets.

20. Installation according to claim 19, wherein the reservoirs are tanks arranged in a first zone of the construction, and the product outlets are arranged in at least one second zone of the construction.

21. Installation according to claim 20, wherein the first evacuation outlet is provided in a lower part of the first tank and the second evacuation outlet is provided in a lower part of the second tank.

22. Installation according to claim 20, wherein the mixing zone is a mixing chamber connected to the evacuation outlets of the reservoirs and to the distribution system.

23. Installation according to claim 22, wherein the mixing system includes a first duct which connects the first evacuation outlet of the first reservoir to the mixing chamber and a second duct which connects the second evacuation outlet of the second reservoir to the mixing chamber.

24. Installation according to claim 22, wherein the mixing chamber is provided in a plane lower than the evacuation outlets of the reservoirs.

25. Installation according to claim 22, wherein the impeller system includes at least one electric pump selected from the group consisting of a first electric pump for pumping the first component of the chemiluminescent product from the first evacuation outlet as far as the mixing chamber and a second electric pump for pumping the second component of the chemiluminescent product from the second evacuation outlet as far as the mixing chamber.

26. Installation according to claim 25, wherein the electric pumps have sufficient power for impelling the chemiluminescent product from the mixing chamber to the product outlets.

27. Installation according claim 22, wherein the mixing system includes an impeller electric pump connected to the mixing chamber and to the distribution system for impelling the chemiluminescent product from the mixing chamber to the product outlets.

28. Installation according to claim 19, wherein the first reservoir and the second reservoir are chambers with a single tank.

29. Installation according to claim 19, wherein
the first evacuation outlet of the first reservoir is connected to an inlet opening of the second reservoir;
the mixing zone is situated in the second reservoir as a continuation of the inlet opening;
the second evacuation outlet is connected to the distribution system;
and wherein it includes
decanting means for decanting the first component of the chemiluminescent product from the first reservoir to the second reservoir; and
generator means of sequential orders for activation connected to the receiving means for sequentially activating the decanting means and the impeller system.

30. Installation according to claim 29, wherein it includes a decanting duct connected to the first product outlet and to the inlet opening.

31. Installation according to claim 30, wherein the decanting means include an electric decanting pump that can be actuated in response to an activator order and connected to the decanting duct for pumping the first component of the chemiluminescent product to the second reservoir.

32. Installation according to claim 29, wherein
the first reservoir is provided in a plane higher than the second reservoir;
the first evacuation outlet is provided in the lower part of the first reservoir; and,
the decanting means include an electrovalve which opens in response to an opening order generated by the generator means of sequential orders.

33. Installation according to claim 29, wherein the inlet opening is provided in the upper part of the second reservoir.

34. Installation according to claim 29, wherein the mixing system includes an electric impeller pump connected to the second evacuation outlet and to the distribution system.

35. Installation according to claim 19, wherein the construction is a building.

36. Installation according to claim 19, wherein the construction is a ship.

37. Installation according to claim 2, wherein the sealing means are selected from the group consisting of automatic valves which open in response to an increase in pressure from the fluid in the reservoir that they seal, membranes that break when the pressure of the fluid in the reservoir they seal increases, or flaps that open when the pressure of the fluid in the reservoir they seal increases.

38. Installation according to claim 1, wherein the reservoirs and the mixing system are provided in an interior zone of the vehicle and in that the product outlets are provided in the exterior parts of the vehicle.

39. Installation according to claim 38, wherein it includes
an upper right distribution duct with at least one upper right product outlet, and a lower right distribution duct with at least one lower right product outlet; and
an upper left distribution duct with at least one upper left product outlet, and a lower left distribution duct with at least one lower left product outlet.

40. Installation according to claim 38, wherein at least one of the product outlets is provided with a spray nozzle oriented in such a way that it projects the chemiluminescent product onto at least one external part of the vehicle.

41. Installation according to claim 1, wherein the reservoirs and the mixing system are provided in an interior zone of a land vehicle and in that the product outlets are provided in the body of the vehicle.

42. Installation according to claim 1, wherein the installation includes timer means which, when the receiving means receive the activation signal from the impact detector means, delay the activation of the impeller system.

43. Installation according to claim 1, wherein at least one of the product outlets is provided with a spray nozzle.

44. Installation according to claim 1, wherein at least one of the product outlets is connected to a product tank that is at least translucent for the chemiluminescent product.

45. Installation according to claim 44, wherein the product tank is included in a trim of an automobile vehicle.

* * * * *